(12) United States Patent
Chmura et al.

(10) Patent No.: US 7,480,659 B2
(45) Date of Patent: Jan. 20, 2009

(54) SYSTEM AND METHOD FOR MANAGING ECONOMIC DEVELOPMENT, WORKFORCE DEVELOPMENT AND EDUCATION INFORMATION

(75) Inventors: Christine Chmura, Richmond, VA (US); Leslie Peterson, Richmond, VA (US)

(73) Assignee: Chmura Economics & Analytics, LLC, Richmond, VA (US)

( * ) Notice: Subject to any disclaimer, the term of this patent is extended or adjusted under 35 U.S.C. 154(b) by 213 days.

(21) Appl. No.: 11/251,811

(22) Filed: Oct. 18, 2005

(65) Prior Publication Data

US 2006/0085455 A1    Apr. 20, 2006

Related U.S. Application Data

(60) Provisional application No. 60/619,861, filed on Oct. 18, 2004.

(51) Int. Cl.
*G06F 7/00* (2006.01)
*G06F 17/30* (2006.01)

(52) U.S. Cl. ........................ 707/10; 707/100
(58) Field of Classification Search .................. 705/7, 705/10; 707/104.1, 109.1
See application file for complete search history.

(56) References Cited

U.S. PATENT DOCUMENTS

| 7,054,864 B1* | 5/2006 | Toomey | 707/10 |
| 2004/0236598 A1* | 11/2004 | Thomsen | 705/1 |

\* cited by examiner

*Primary Examiner*—Wilson Lee
*Assistant Examiner*—Nicholas E Allen
(74) *Attorney, Agent, or Firm*—Smith, Gambrell & Russell

(57) ABSTRACT

Economic development and workforce development information, such as historical and forecasted economic data regarding economic variables including but not limited to jobs, unemployment, wages, and/or productivity, etc., and/or any changes therein are stored in a database. Access to the data stored in the database is provided via a web portal running on a data server coupled to the Internet. Users access the data using a web browser client. Data stored in the database are updated from time to time, such as, for example, monthly and/or quarterly. User tools are provided for assembling and processing the data in ways meaningful to the user.

20 Claims, 35 Drawing Sheets

SYSTEM AND METHOD FOR MANAGING ECONOMIC DEVELOPMENT, WORKFORCE DEVELOPMENT AND EDUCATION INFORMATION

RELATED APPLICATION

This application claims the benefit of priority for U.S. Provisional Application 60/619,861 entitled SYSTEM AND METHOD FOR MANAGING ECONOMIC DEVELOPMENT INFORMATION filed Oct. 18, 2004. This application also hereby incorporates by reference all subject matter set forth in U.S. Provisional Application 60/619,861.

BACKGROUND AND SUMMARY

In a dynamic economy, the fortunes of industries adjust because of changes in preferences, technology, international trade, and government regulations. As industries change, demand for occupations and skills adjust as does the need for various training and instructional programs. Accordingly, an information system is needed to help economic and workforce developers, policymakers, educators, incumbent workers, jobseekers, and students assess alternative paths that take into account the expected need for occupations and skills.

The systems and methods described herein provide a comprehensive arrangement for gathering raw data such as economic development and workforce development information including historical and forecasted economic data, organizing that data in a database in a manner in which it can be usefully mined, analyzing the data with a plurality of user selectable analytical tools and presenting mined and organized data to an end user in a way that answers a user's inquiry via a web-based interface. Inventions described herein relate to the manner of gathering the data, the manner of organizing it, the manner of mining that data, the tools that can be selected and utilized by the end user and the overall manner of providing these data in a convenient web accessible manner.

In the past, some of this type of information has been obtained from various government documents and websites. However, the process of collecting and linking the data to make it useful has been cumbersome and often required strong analytical skills. Consequently, information seekers either ignored the information or did not ascertain the full implication of the available information. In this environment, analysts were forced to spend hours collecting, manipulating, and analyzing the disparate sources of data. By the time all necessary data were collected, adjusted, and analyzed, the information often became outdated, sometimes leading to incorrect decisions.

In order to provide a system for better-decision making for economic and workforce developers, policymakers, educators, incumbent workers, jobseekers and students, there is now provided a web-based information system including decision support to assist users in considering alternative decision paths. Such alternative decision paths include, for example, whether to offer or take secretarial training in light of expected growth rates and future job opportunities in a local economy. The inventions are collectively referred to as a "system" throughout this document. The system described herein is implemented using a relational database and graphical user interface that allows a user to query the database to mine the appropriate information addressing a question and then report the mined information in the form of reports, charts, tables, and maps. Dynamic decision support (e.g., as to whether or not to offer certain courses at an educational institution or to attract particular industries to a region) provides information and recommendations to decision makers, tailored to the geographic region, industry, and/or occupation required by the user.

The use of the claimed system allows a user to increase productivity and leads to better decision making. Users are able to quickly select and utilize analytic tools that provide answers to questions that formerly took days or weeks, even months to compile. Also, help tools are provided to guide the user with information and guidelines for interpreting and using data mined from the database.

Economic development, workforce development and education key information outputs, such as historical and forecasted economic data regarding economic variables including but not limited to jobs, unemployment, wages, and/or productivity, etc., and/or any changes therein are stored in a database. The presently preferred database is an SQL database. Access to the data stored in the database are provided via a web portal running on a data server coupled to the Internet. Users access the data using a web browser client. Data stored in the database are updated from time to time, such as, for example, monthly and/or quarterly. User tools are provided for assembling and processing the data in ways meaningful to the user.

The user tools allow the historical and/or forecasted economic data to be provided in various forms useful to the end user including, for example, charted and/or rendered forms. The economic data can be correlated to a user-selected economic variable and/or any of a wide variety of user-selectable parameters, such as:

region (e.g., state, metropolitan statistical area (MSA), planning district commission (PDC), workforce investment area (WIA), county, and/or city, etc.);

industry (e.g., 2- through 5-digit standard industrial classification (SIC) and/or North American Industry classification system (NAICS), and/or uncoded industry, etc.);

employer characteristic (e.g., size, legal structure, headquarters location, historical behavior (e.g., rapid growth, local growth, quality of growth, prone to layoffs, etc.), etc.);

occupation (e.g., standard occupational code (SOC), etc.); and/or worker attribute (e.g., credential, knowledge, experience, skill, and/or ability, etc.);

demographics (e.g., age, gender, education, etc.); etc.

Historical and/or forecasted economic variables include, for example, jobs, occupations, and/or attributes. These historical and/or forecasted economic variables can comprise statements and/or estimates of supply and/or demand, which can utilize and/or integrate any of numerous potential factors. For example, historical and/or forecasted economic variables such as wages, jobs, occupations, worker attributes, employment, and/or unemployment, etc. They can relate to, be determined from, and/or comprise absolute values and/or changes, events, emergences, growths, declines, shifts, trends, and/or patterns relating to factors such as:

macro-economics (e.g., gross domestic product (GDP), per-capita income, prices, inflation, interest rates, exchange rates, balance of trade, government spending, etc.);

population;

demographics;

consumer spending;

travel and/or tourism;

technology (from the broadest to the narrowest sense of the term);

number of employed;

type of employed (e.g., full-time, part-time, hourly, salary, etc.);
number of unemployed;
type of unemployed (e.g., underemployed and/or actively seeking, etc.);
emerging workforce (e.g., arising from academic and/or other training, entry- and/or lower-level positions, horizontally transitioning, in-migration, etc.);
fading workforce (e.g., retiring, expiring, transitioning away (vertically and/or horizontally), out-migration, etc.); and/or
personal characteristics (e.g., education, sex, and/or age, etc.); etc.

Using government-provided data for occupation-related worker attributes, occupations can be automatically mapped into occupation groups using data mining and mapping tools incorporating algorithms. Within each occupation group, training ladders can be generated, the training ladders indicating what worker attributes are needed and/or desired to obtain and/or maintain each occupation, to move from one "rung" to another in a "vertical" progression in a career, and/or to "horizontally" change occupations and/or careers, etc.

A user-selected worker attribute, from among many available worker attributes, can be mapped to degrees, certificates, courses, trainings (including training that is on-the-job, hands-on, and/or experiential, etc.), and/or salaries by industry etc., that are suggested and/or required to obtain and/or maintain that selected worker attribute. This mapping can extend to post-academic, post-graduate, graduate, undergraduate, associate, military, technical, vocation, high school, pre-high school, and/or other degrees, certificates, courses, and/or trainings.

This mapping can be general and/or specific. For example, one or more particular courses of study can be mapped to specific regional academic institutions offering each course, the times the course is offered, the capacity of the course, admission and/or registration procedures, the cost of the course, the availability of and/or requirements for financial aid, textbooks and/or other materials required and/or suggested, etc. Similar mapping can be provided for off-campus coursework, such as on-line and/or correspondence courses. Conversely, such mapping can forecast the demand and/or need to provide various degrees, certificates, courses, and/or trainings, etc.

For any user-selected parameter, performance related to any relevant economic criteria can be determined, measured, estimated, rendered, and/or tracked. Likewise, objectives, goals, and/or plans related to any user-selected economic criteria can be selected, entered, measured, and/or tracked at any desired time and/or frequency. Notifications can be provided if performance deviates by a user-determined value from a goal, average, and/or norm, etc. Examples of economic criteria can include:
entrepreneurial activities;
productivity;
wealth creation;
employer retention;
knowledge base and/or workers;
economic diversity;
utilization of community assets (e.g., academic and/or training resources, such as institutions, facilities, and/or personnel; programs; services, etc.); and/or
commuting patterns; etc.

Thus, for example, for a given region, a goal related to entrepreneurial activities can be set and performance against that goal by the region can be tracked and/or reported in the balanced scorecard. A notification can be provided, such as via an e-mail message to a predetermined individual, if for example, quarterly performance exceeds the goal by more than 5 percent, and/or falls below the goal by more than 3 percent.

For any user-selected parameter, leading and/or lagging indicators can be used to determine performance related to any relevant economic variable and/or criteria. For example, with respect to knowledge base, knowledge workers, worker credentials, and/or worker skill level, a leading indicator such as high school drop-out rates, and/or a lagging indicator such as general educational development (GED) award rates, can be utilized.

For any user-selected region, a desirability index can be generated and/or rendered, the index providing an indication of the desirability of attracting and/or retaining one or more user-selected and/or known industries, employers, and/or occupations, etc. The index can be based on knowledge and/or estimates regarding factors related to each industry, employer, and/or occupation, etc., such as whether it pays above-market wages, whether it is likely to grow, whether it is likely to hire locally, and/or whether it provides worker training, etc. The factors can be filtered, adjusted, and/or weighted as desired.

The database contains a critical mass of workforce and economic development data (refreshed and supplemented regularly), the building blocks to wealth, to users at every level of economic development, workforce development, education reform, partnership consulting, human resources, corporate operations, and so forth. The interactive web-based system described herein provides capabilities that include regional specific economic indicators like employment trends, regional wealth, productivity of a region's workforce, entrepreneurial activities, high-technology trends, and forecasts for occupations and industries for every metropolitan statistical area, planning district commission, workforce area, county and city in a state.

Using the system a user can obtain specialty information by ad-hoc query about the economic trends for the users region in the state. It removes traditional barriers between workforce and economic development analysis by aggregating and mining data for each user to understand the dynamic relationship of key economic indicators on current and future industry and occupation trends unique to their region. Brick and mortar economies undergo churn and the new economy emerges seeking a knowledgeable savvy labor market. The system matches trained workers to available jobs and allows workforce development officials to underpin economic development strategies by providing an inventory of workers who are:
Employed
Unemployed
Underemployed
Emerging The system delivers secure, responsive, high-quality, customer-oriented services and support fostering a productive web-enabled database capable of mining key economic and workforce development indicators. Analyzed and organized data from the system can be used as building blocks for engineering a vibrant regional workforce aligned to the strategic goals of the economic development communities. The system is easily and rapidly accessed via a web interface and provides seamless data mining of critical analytics that result in a reliable information coordination environment between workforce development officials, economic development practitioners, education reformers, high-technology industries and occupations, and job seekers.

User selectable analytical tools tie together high-quality government and CEA data along with help tutorials to identify and select alternative actions for a region.

Economic Development officials can benefit from using the system. Economic Development agencies can make informed decisions about their regions industry capabilities that include the knowledge and skills attributes of the local workforce. Among the user tools provided, the system includes the following dashboard analytics (vital economic statistics) for the economic developer end user:

Labor Market and Industry Demand Forecasts by Occupation

Entrepreneurial Activities

Labor Market Inventory

Employment and Unemployment trends

The user, via a standard web browser and Internet access, is presented with a "dashboard" of choices from which he can mine data from the SQL database and apply analytical tools. The user can use this dashboard presentation to drilldown to specific data related to questions at hand and obtain more detailed information about a region's economic and workforce metrics. Gaps for skills shortages allow workforce agencies to develop regional training strategies for retooling the local labor market based on the economic development regional and local strategies for the regions. Labor and industry demands offer a roadmap for strategic initiative planning and resource allocation based on the best fit industry to workforce alignments.

The system is useful for Workforce Development officials. Workforce Development (WD) officials supply Economic Development (ED) and Education (EDU) reform process owners with current data about the attributes of the local workforce. The system provides a web-based, interactive method to track a region's changing workforce performance relative to a baseline and goals over time. WD can provide ED with the following important statistics about a region's workforce today and discuss strategies for future workforce initiatives to meet the needs of potential firms desiring to locate in the WD and ED region:

Employed

Unemployed

Underemployed

Emerging

The system can serve as a useful tool in recruiting new firms and employees to a geographical region. It provides information about the current and future economy for the region as it relates to the supply of workers and the demand for workers based on industry needs. Identification of supply and demand results in the occupational and instructional program gap metrics as well as current and projected inventories of occupations and skills.

It has been nearly impossible to find the caliber of data required for understanding the workforce capabilities for all communities in a given state. It is a daunting task for economic development folks to find as complete a source of quality, up-to-date, and objective data that they can use to benchmark their community against any other in the state. The system includes complex analytical tools that calculate the aggregate skills, knowledge and abilities of the region's workforce and compare these profiles to the current and future demands for these attributes by industry and labor market demands using CEA proprietary technology.

DETAILED DESCRIPTION

Figure 1:
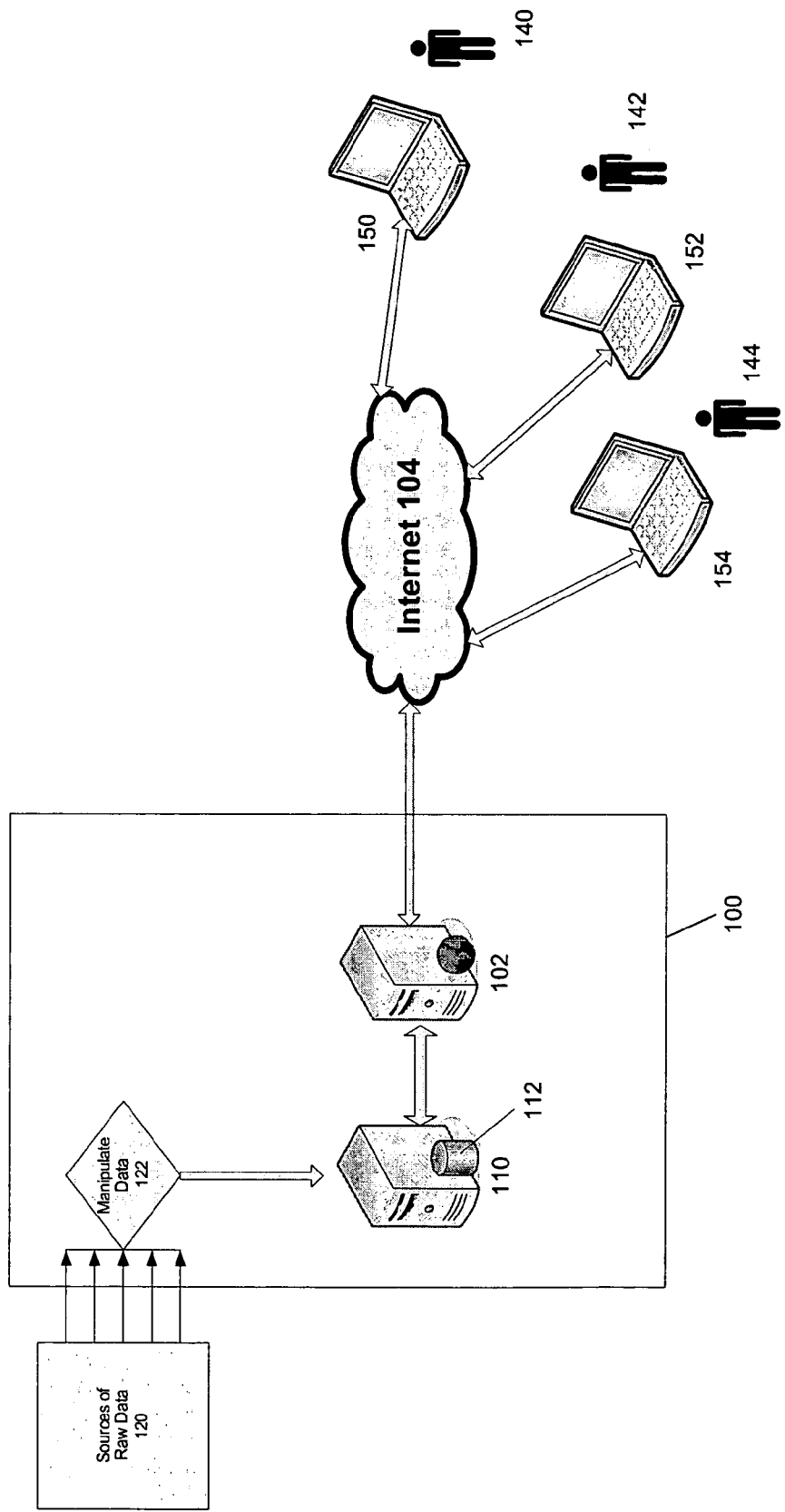
FIG. 1 is a schematic diagram providing an overview of the inventions.

FIG. 1 is a schematic diagram providing an overview of the inventions. The information and decision support system according to the inventions is generally denoted by reference numeral 100. System 100 gathers raw data, such as economic statistics, from a various data sources, collectively denoted by reference numeral 120. Data from these various data sources 120 are manipulated by processes collected denoted by reference numeral 122 and ultimately stored in an SQL database 112 residing in a data base server 110. Database server 110 manages database 112 and serves data from database 112 to end users via a web server 102. In its presently preferred form, end users interact with system 100 via a collection of web pages collected known as "JobsEQ™", a trademark of Chmura Economics & Analytics, LLC (CEA). Web server 102 serves the various web pages of JobsEQ™ and data retrieved from database 112 to end users 140, 142 and 144 via the Internet 104. End users 140, 142 and 144 can access system 100 using a standard web browser, such as Internet Explorer, running on a computer such as computers 150, 152 and 154.

Figure 2:
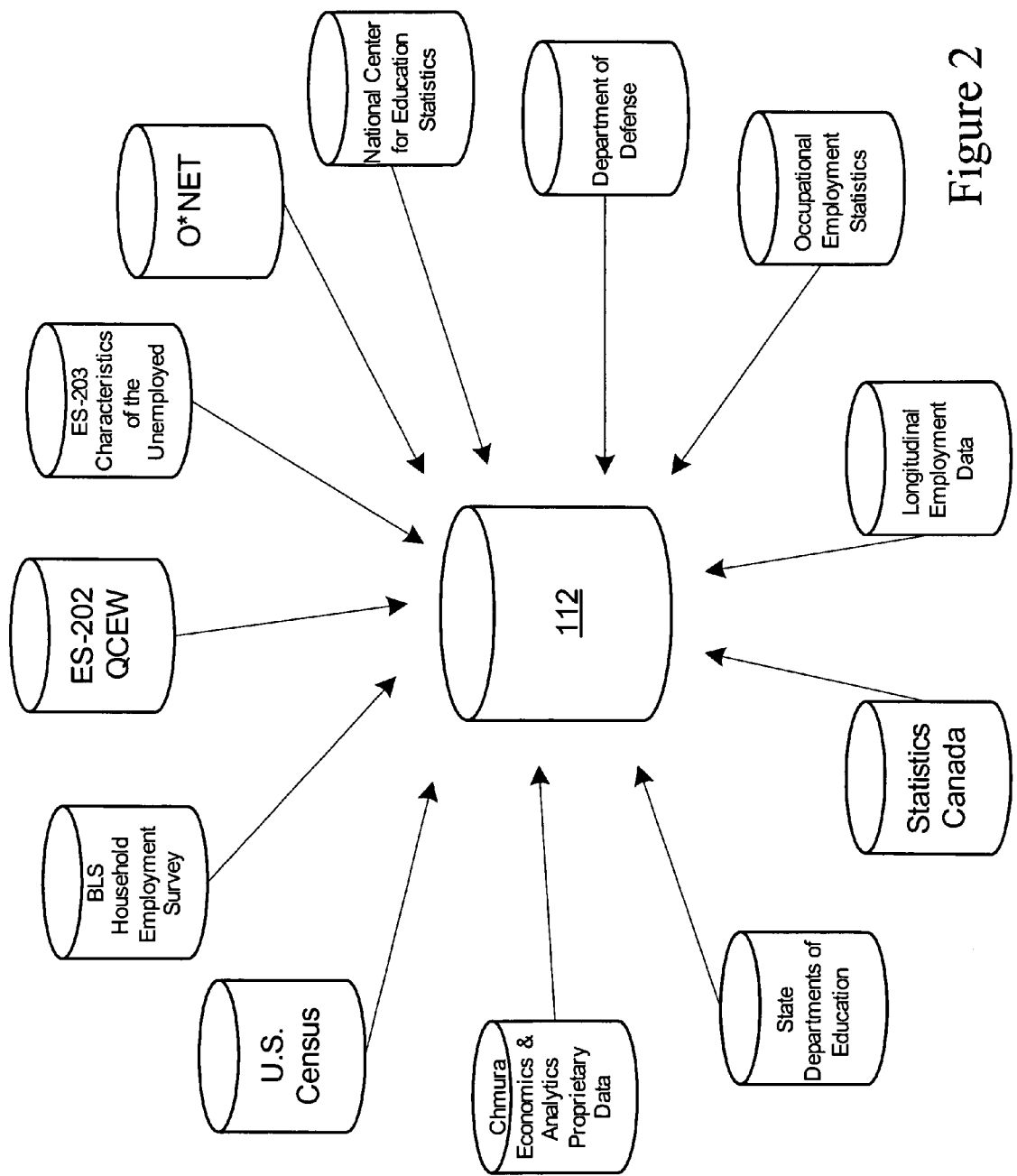
FIG. 2 is a schematic diagram showing that data from various sources are gathered and, after processing, stored in database 112.

FIG. 2 is a schematic diagram showing that data from various sources are gathered and, after processing, stored in database 112. The figure shows twelve exemplary data sources. Particular data sources and types of data are design choices. There may be many more than twelve such data sources, or fewer. In the presently preferred arrangement of system 100, data are retrieved from the following sources:

Statistics Canada
State Departments of Education
CEA Proprietary Data
U.S. Census
U.S. Bureau of Labor Statistics (BLS) Household Employment Survey
BLS ES-202 Quarterly Census of Employment and Wages (QCEW)
BLS ES-203 Characteristics of the Unemployed
BLS O*NET
National Center for Education Statistics
U.S. Department of Defense
BLS Occupational Employment Statistics (OES)
Census Local Employment Dynamics (LED)
American Chamber of Commerce Rating Association (ACCRA)

These data are received in various forms including, for example, flat files and other data configurations. Processes 122, shown generally in FIG. 1 and in greater detail in FIG. 3, include various algorithms and processes for converting the data from data sources 120, which may be in various disparate forms in their respective native formats, into formats of data appropriate to store into a plurality of tables in database 112.

Figure 3:
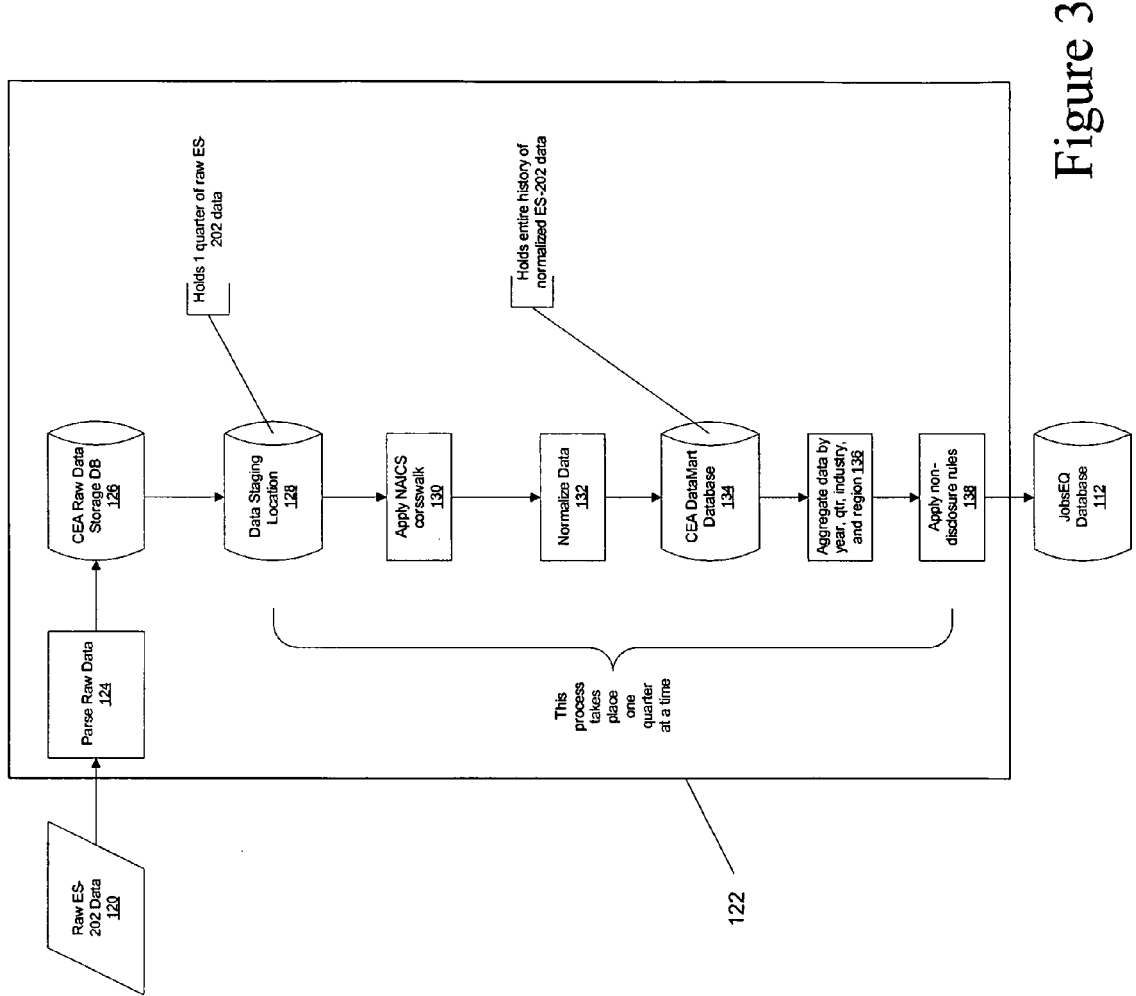
FIG. 3 is a flow chart explaining how data from data sources 120 are manipulated and stored into database 112.

FIG. 3 is a flow chart explaining how data from data sources 120 are manipulated and stored into database 112. These processes are collectively referred to by reference numeral 122. Raw data, collectively 120, are parsed at step 124 and stored in a CEA Raw Data Storage Database 126. It is presently preferred that raw data are processed one quarter at a time for convenience. Of course this is a matter of design choice. It happens to be convenient based on hardware currently selected and utilized. One quarter of the raw data are stored in a data storage location 128. At step 130 North American Industry Classification System (NAICS) crosswalk is applied. This crosswalk transforms the new data in the following three ways: 1) data with a Standard Industrial Classification code (the precursor to NAICS) but no NAICS is given the proper NAICS code; 2) NAICS codes that still possess codes under the NAICS 1997 system are given the proper NAICS 2002 code; and 3) NAICS with 'unknown' codes that have SIC codes are given the proper NAICS code. The data are then normalized at step 132. Normalized data are then stored in a CEA DataMart Database 134. At step 136, data are aggregated by year, quarter, industry and region. Non-disclosure rules are applied to the data at step 138. The thus processed data are then stored in database 112. Flow chart elements 128-138 are repeated for each quarter of the data so that all of the raw data are processed and stored into database 112.

Database 112 includes multiple tables (twenty two in the presently preferred embodiment). Data from the various data sources is gathered and reorganized into the tables of database 112. The organization of data in database 112 in part makes it possible for a user to obtain answers to various inquires.

Figure 4:
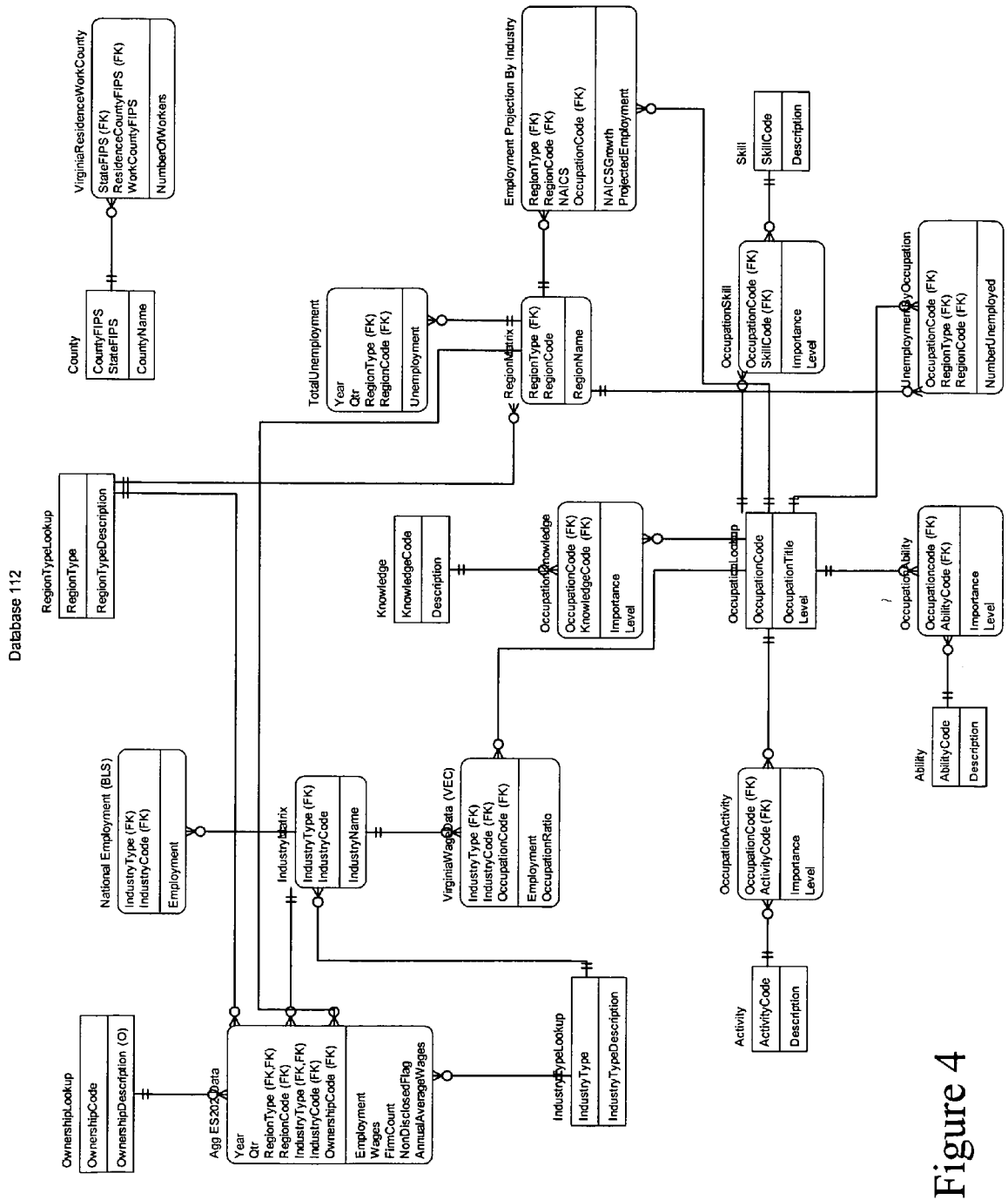
FIG. 4 is a schematic diagram explaining the structure of database 112.

FIG. 4 is a schematic diagram explaining the structure of database 112. Database 112 includes multiple tables that are linked as shown in the FIG. 4. Each block in the figure represents a table. The upper portion of each table block shows one or more fields of data that are primary keys. Multiple primary keys are known in the database world as "compound keys." The lower portion of a table block shows the remaining fields of data that are not primary keys.

As shown in FIG. 4, there are twenty two (22) tables in database 112 as presently preferred. As an example, the "Industry Matrix" table has three fields of data, two of which are primary keys ("IndustryType" and "Industry Code"). The third filed, not a primary key, is "IndustryName." The lines between table blocks indicate links between fields in different tables. In some cases, linked fields have the same exact name, but in other cases, a different field name is used. The symbols at link points ("crows feet") indicate the dependency of one table on another in the standard manner practiced by database programmers.

FIG. 4 crosswalks a number of databases thus allowing estimated up-to-date occupation, education, and skill gaps that can be forecast into the future based on industry and occupation forecasts. For each region specified within JobsEQ™, the industry mix of that region is a starting point from which total occupations are estimated based on the distribution of occupations-to-industries in the region, state, or nation. The algorithm takes the percent distribution of occupations and assumes the same distribution occurs in the region. For example, if 2% of all workers in the textile industry are secretaries, then it is assumed that 2% of the specified region's occupations related to textiles are secretaries. Education, training, and skills needed for occupations are estimated in a like manner by using crosswalks or CEA data mining that links the information to occupations.

Forecasts of occupations and industries, which reflect the supply for workers as well as the demand for workers, identifies current and future estimated gaps in the region selected by assuming that occupations and industries in the region grow at the same rate as those of the nation. For example, if 90% of a region's employment is in textiles, then the region's employment will be forecast to decline because the textile industry is forecast to decline in the nation. In contrast, a region where 90% of employment is in professional services will be forecast to grow because professional services is forecast to be a fast growing industry in the nation.

Data from the various data sources are gathered and reorganized into the tables of database 112. The organization of data in database 112 in part makes it possible for a user to obtain answers to various inquires. Three exemplary tables with sample records are illustrated below.

Three exemplary tables with sample records are illustrated below.

The following are sample records from the "Total Unemployment" table.

| Year | Qtr | RegionType | RegionCode | Unemployment |
|------|-----|------------|------------|--------------|
| 2004 | 4   | 1          | 3          | 165          |
| 2004 | 3   | 1          | 3          | 160          |
| 2004 | 2   | 1          | 3          | 150          |
| 2004 | 1   | 1          | 3          | 159          |

The following are sample records from the "Region Matrix" table.

| RegionTyp | RegionCode | RegionName |
|-----------|------------|------------|
| 1         | 1          | Accomack   |
| 1         | 3          | Albermarle |
| 1         | 5          | Alleghany  |

The following are sample records from the table "Employment Projections by Industry" table.

| RegionType | RegionCode | NAICS  | OccupationCode | NAICSGrowth | ProjectEmployment |
|------------|------------|--------|----------------|-------------|-------------------|
| 1          | 1          | 236118 | 41-9099        | 8.31        | 0.1687            |
| 1          | 1          | 236118 | 43-3021        | 8.31        | 0.00139382        |

Figure 5:
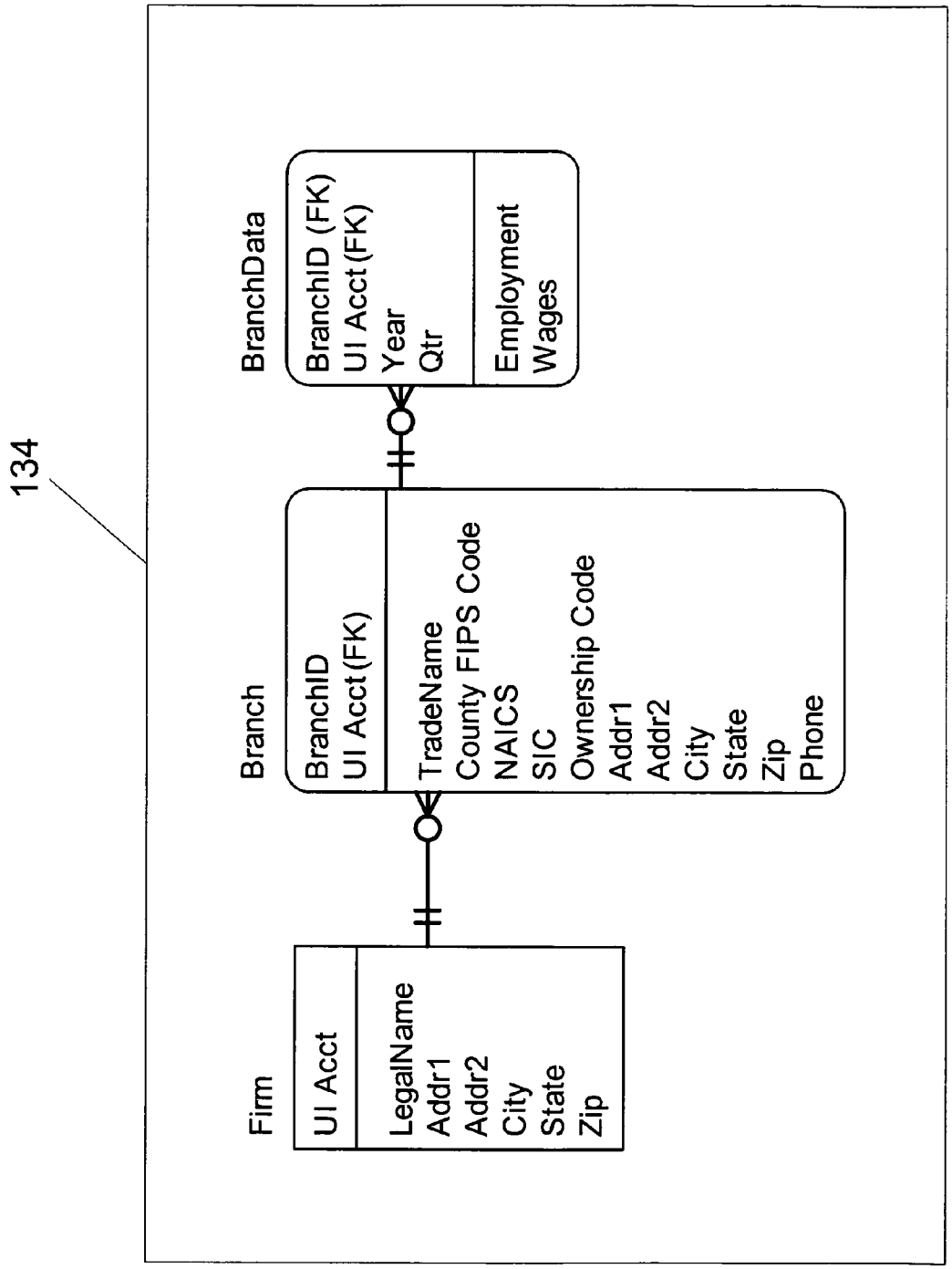
FIG. 5 is a schematic diagram explaining CEA datamart database 134 (see FIG. 3)

FIG. 5 is a schematic diagram explaining CEA datamart database 134 (see FIG. 3). The CEA datamart database 134 stores Normalized ES-202 data. The CEA datamart database is a database that stores information in a useful form after it has been imported, normalized and otherwise processed as shown in FIG. 3. The CEA datamart database 134 has three tables: "Firm", "Branch", and "BranchData." The "Firm" table stores the name of each company or firm having data in database 112. The "Firm" table includes, for example, the name and address of such companies. The "Branch" table stores information related to each branch (location) of a company including, for example, names under which it trades, geographical designators, local branch addresses, phone numbers, etc. The "Branch Data" table stores economic data related to particular branches. Each branch of a company or firm is assigned a "branchID" designating that branch. Data points related to a particular branch are stored in the "Branch-Data" table as individual records. There can be multiple records for a given "BranchID." For example, one branch may have a record for each quarter of multiple years.

As shown in FIG. 5, the upper portion of each table block shows one or more fields of data that are primary keys. Multiple primary keys are known in the database world as "compound keys." The lower portion of a table block shows the remaining fields of data that are not primary keys. The symbols at link points ("crows feet") indicate the dependency of one table on another in the standard manner practiced by database programmers.

Figure 6:
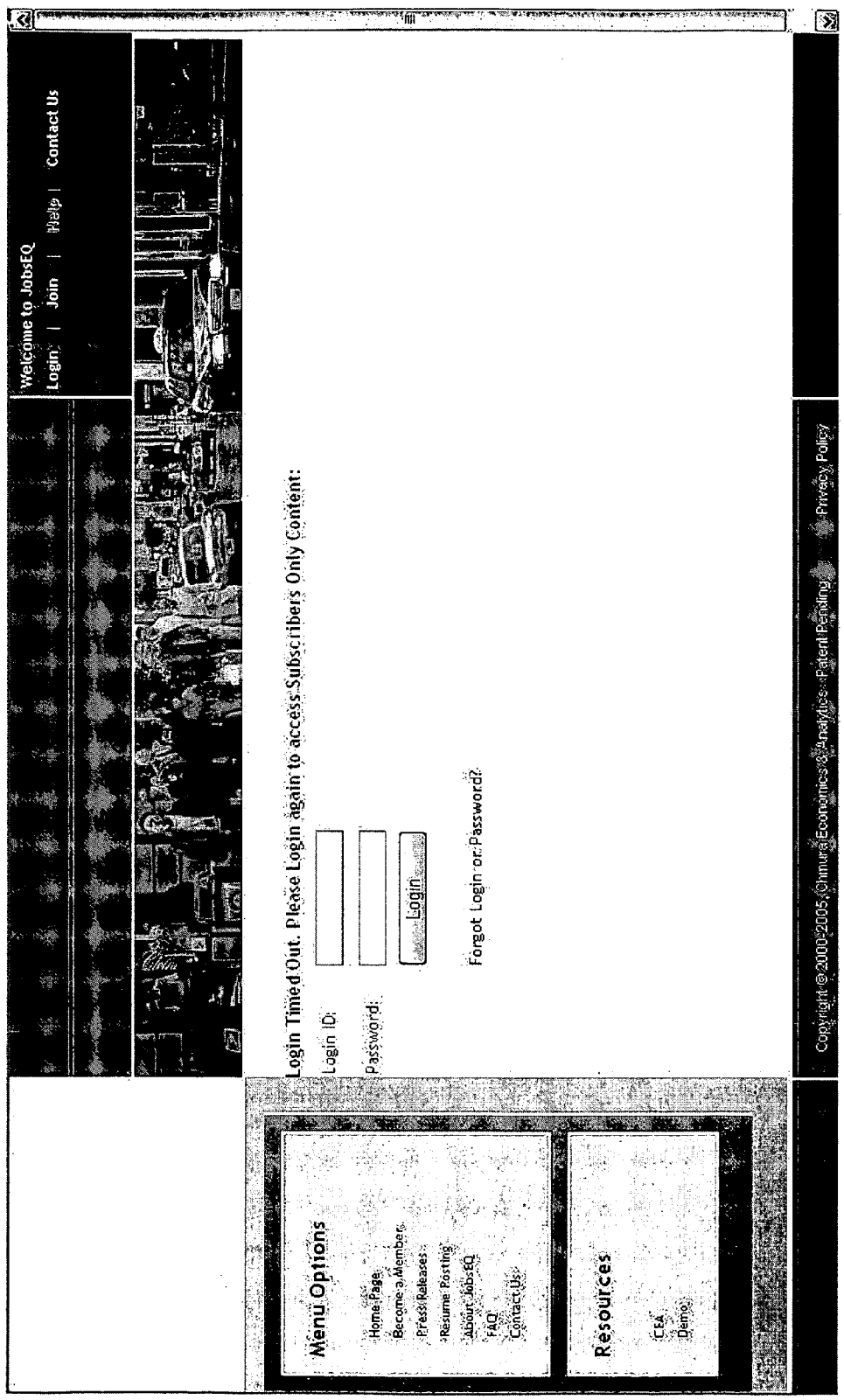
FIG. 6 is a diagram of a login screen of the "JobsEQ™ web pages which provides a vehicle for delivering data from database 112 to a web-based end user.
Figure 7:
FIG. 7 is a diagram showing a post login main menu of the "JobsEQ™" web pages.

FIG. 6 is a diagram of a login screen of the "JobsEQ™" web pages which provides a vehicle for delivering data from database 112 to a web-based end user. At this website, prior to login, the user is presented with the following menu:

Menu Options
   Home Page
   Become a Member
   Press Releases
   Resume Posting
   About JobsEQ™
   Contact us Resources
   CEA
   Demo FIG. 7 is a diagram showing a post login main menu of the "JobsEQ™" web pages. After login, the user is presented with the following main menu selections:
   Labor Analytics
   Knowledge Analytics
   Career Analytics
   Demographic Analytics
   Policy Development Each of these main menu selections has sub menu selections as will be further described below.

Figure 8:
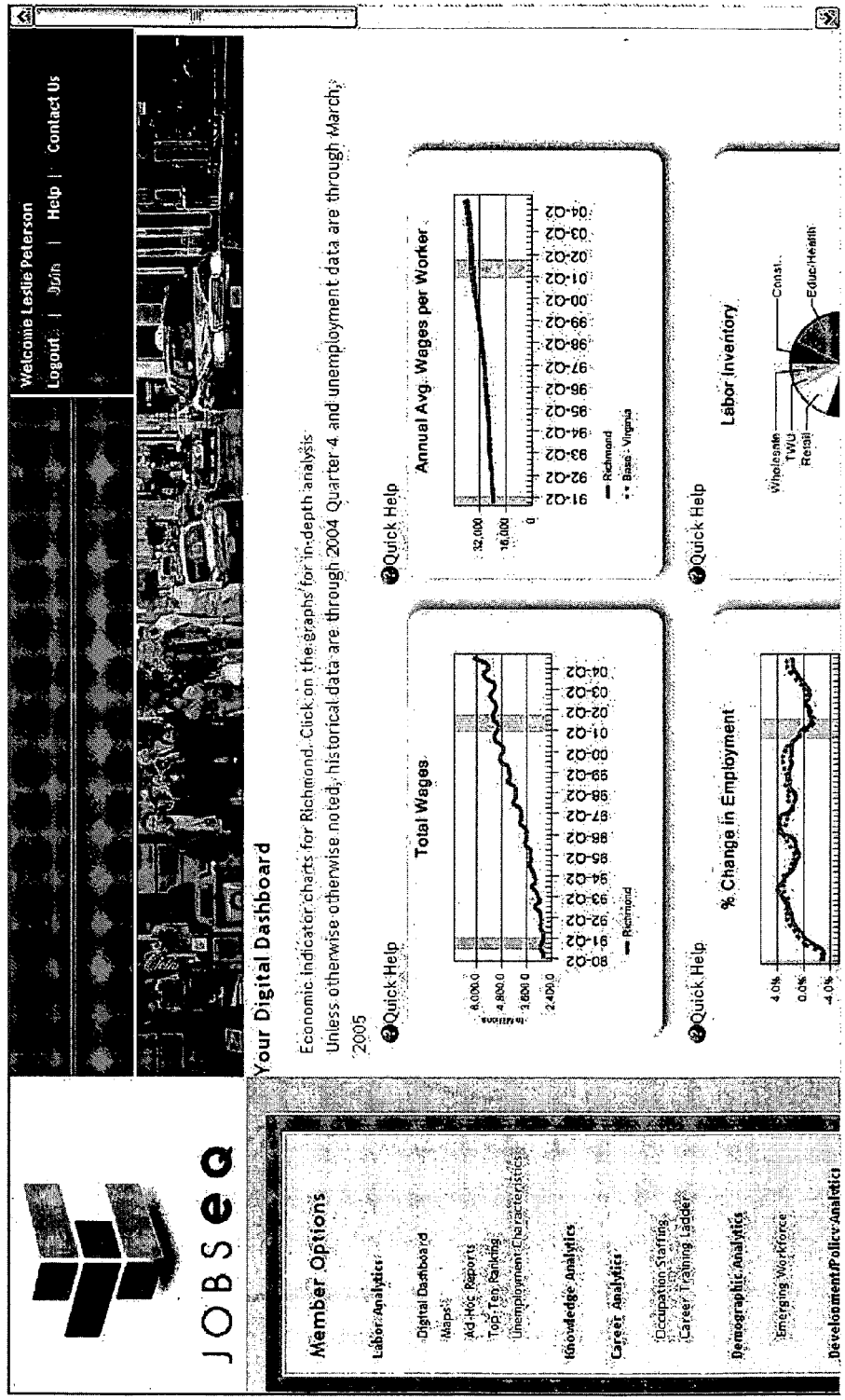
FIGS. 8, 9 and 10 are screenshots of the upper, middle and lower portions (when scrolling) of a "Digital Dashboard" from which a user can navigate the JobsEQ™ web pages after login.
Figure 9:
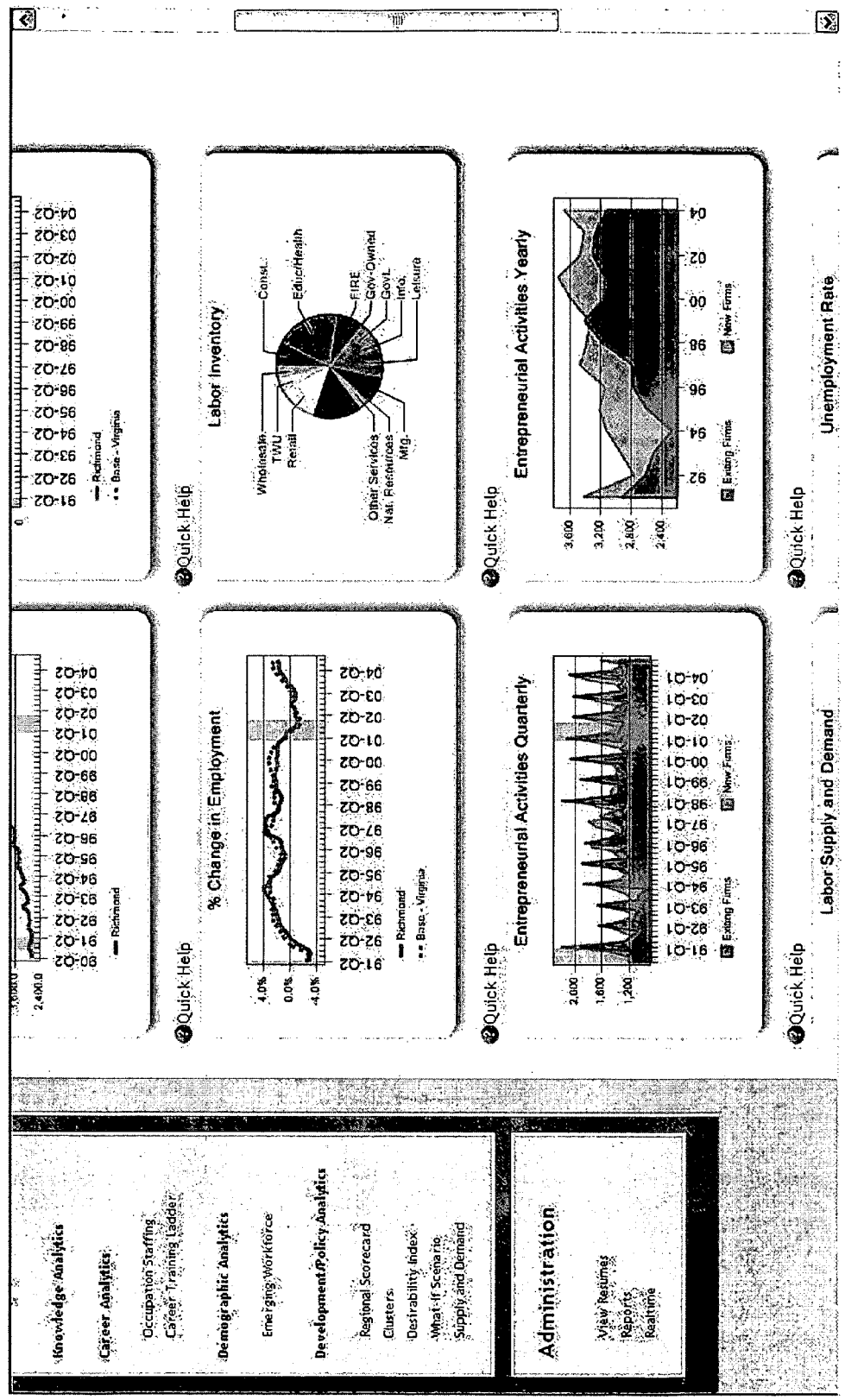
Figure 10:
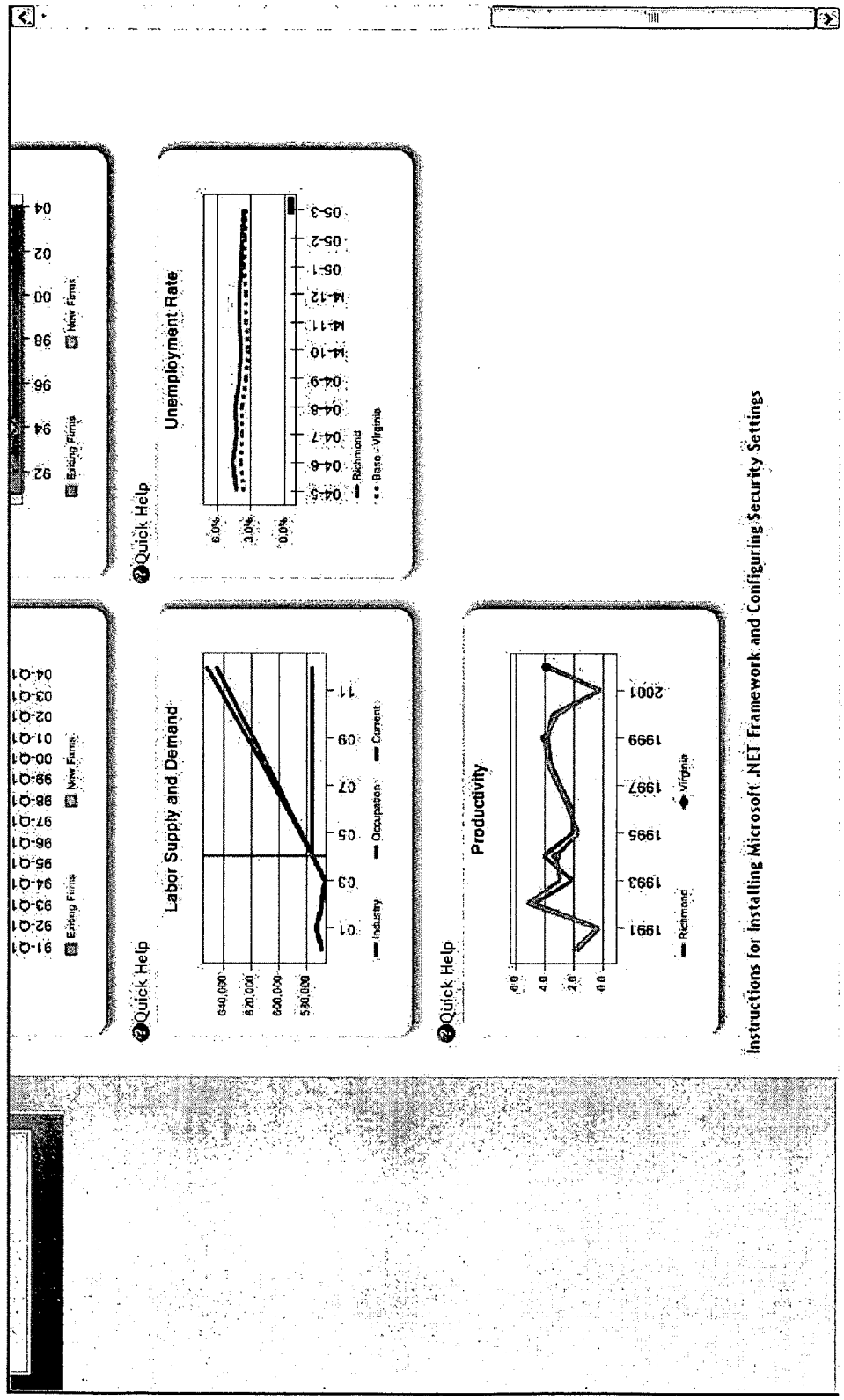

FIGS. 8, 9 and 10 are screenshots of the upper, middle and lower portions (when scrolling) of a "Digital Dashboard" from which a user can navigate the JobsEQ™ web pages after login. Various clickable choices are presented to the user in the form of chart and graph samples to that illustrate some of the capabilities of the system. For example, there are clickable charts for: "Total Wages", "Annual Average Wages per Worker", "Change in Employment", "Labor Inventory", "Entrepreneurial Activities Quarterly", "Entrepreneurial Activities Yearly", "Labor Supply and Demand", "Unemployment Rate", and "Productivity".

A powerful feature of the inventions relates to the manner in which pieces of data are related to each other and presented to the user in the form of charts, graphs and maps that allow a user to answer questions that cannot otherwise be easily answered and to have those answers presented in a user friendly manner.

Figure 11:
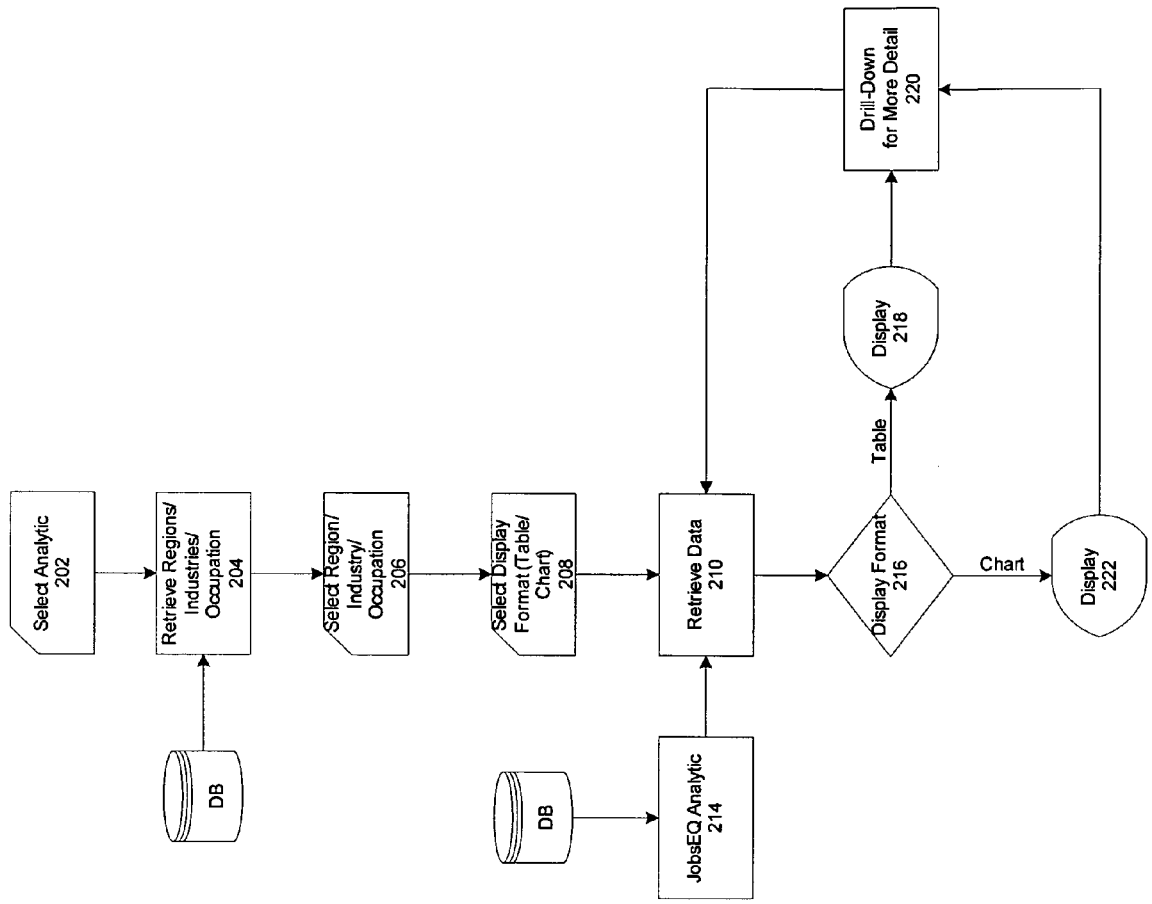
FIG. 11 is a flowchart showing the general process flow explaining how data are extracted from the database, manipulated and delivered to an end user.

FIG. 11 is a flowchart showing the general process flow explaining how data is extracted from the database, manipulated and delivered to an end user. At block 200, an end user selects a particular analytical tool to be used in extracting data and presenting it in a selected form. When a particular tool is selected, the user is presented with various choices for narrowing data that are consistent with the use of the particular tool selected. For example, in block 202 the user selects particular geographical regions, industries and occupation. Data in accordance with the user selection at block 204 is extracted from database 112. At block 206 the user makes follow up choices regarding geographical regions, industries and occupations. At block 208 the user selects a format for data display. At block 210 data are retrieved from database 212 using the JobsEQ™ analytical tool 214. A display format is decided at block 216. Display occurs at block 218. At block 220 the user has an opportunity to drill down for more detailed data. At block 222 there is a final display of data in chart or table from that can be copy-pasted to other documents such as Microsoft Word, Excel or PowerPoint. Following are specific examples of such data retrieval and display.

Figure 12:
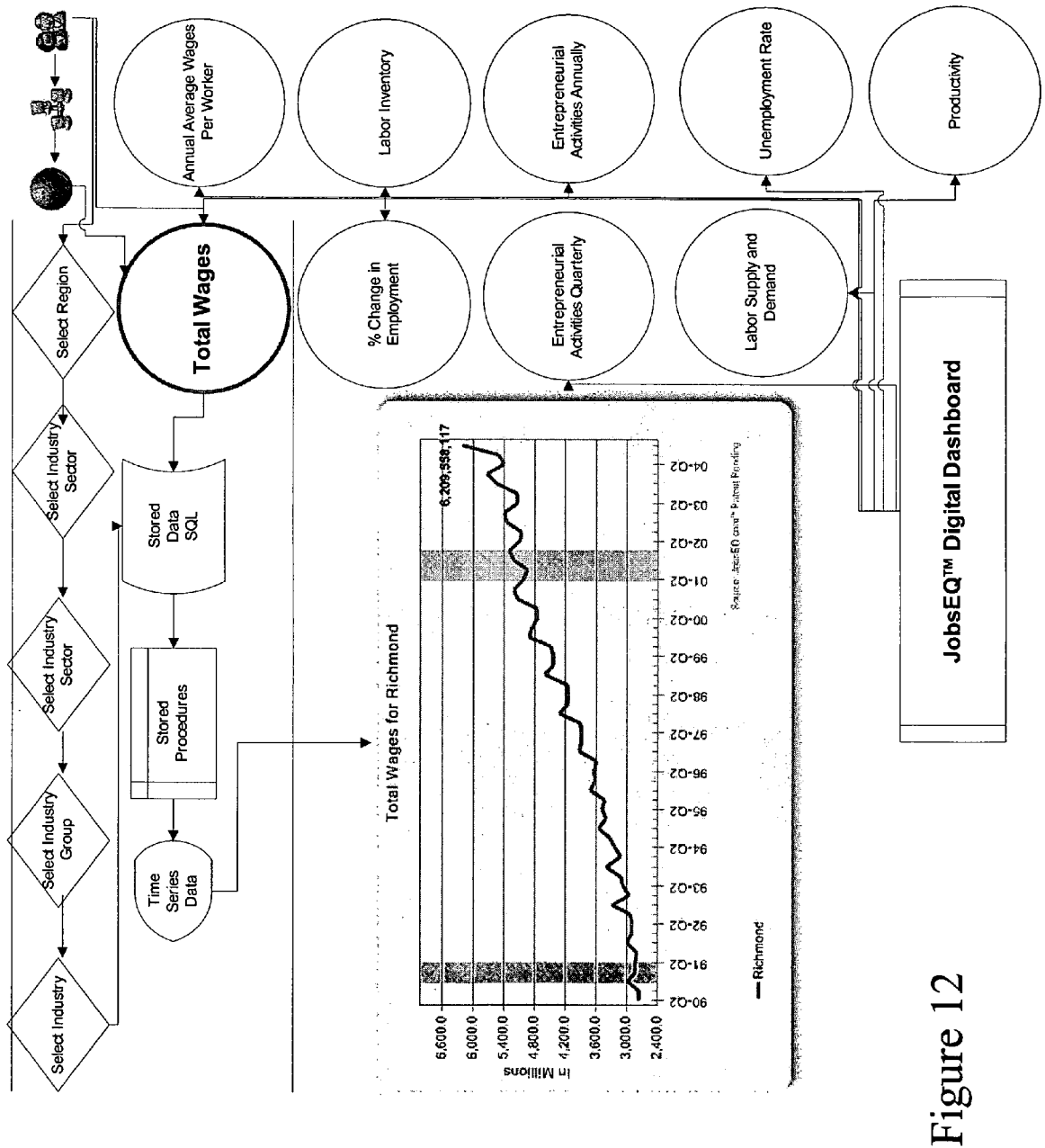
FIG. 12 is a schematic diagram showing an example of how a user obtains information related to "Total Wages".

FIG. 12 is a schematic diagram showing an example of how a user obtains information related to "Total Wages". A user can "drill down" into the data stored in database 112 and retrieve data related to wages that relate to a particular geographical region, a particular industry sector, a particular industry group and a particular industry. At the bottom portion of the figure is a block labeled "Jobs EQ™ Digital Dashboard" which is shown in screenshots in FIGS. 6, 7 and 8. By clicking on the "Total Wages" chart displayed on the "Jobs EQ™ Digital Dashboard", the user is presented with a screen as shown in FIG. 13.

Figure 13:
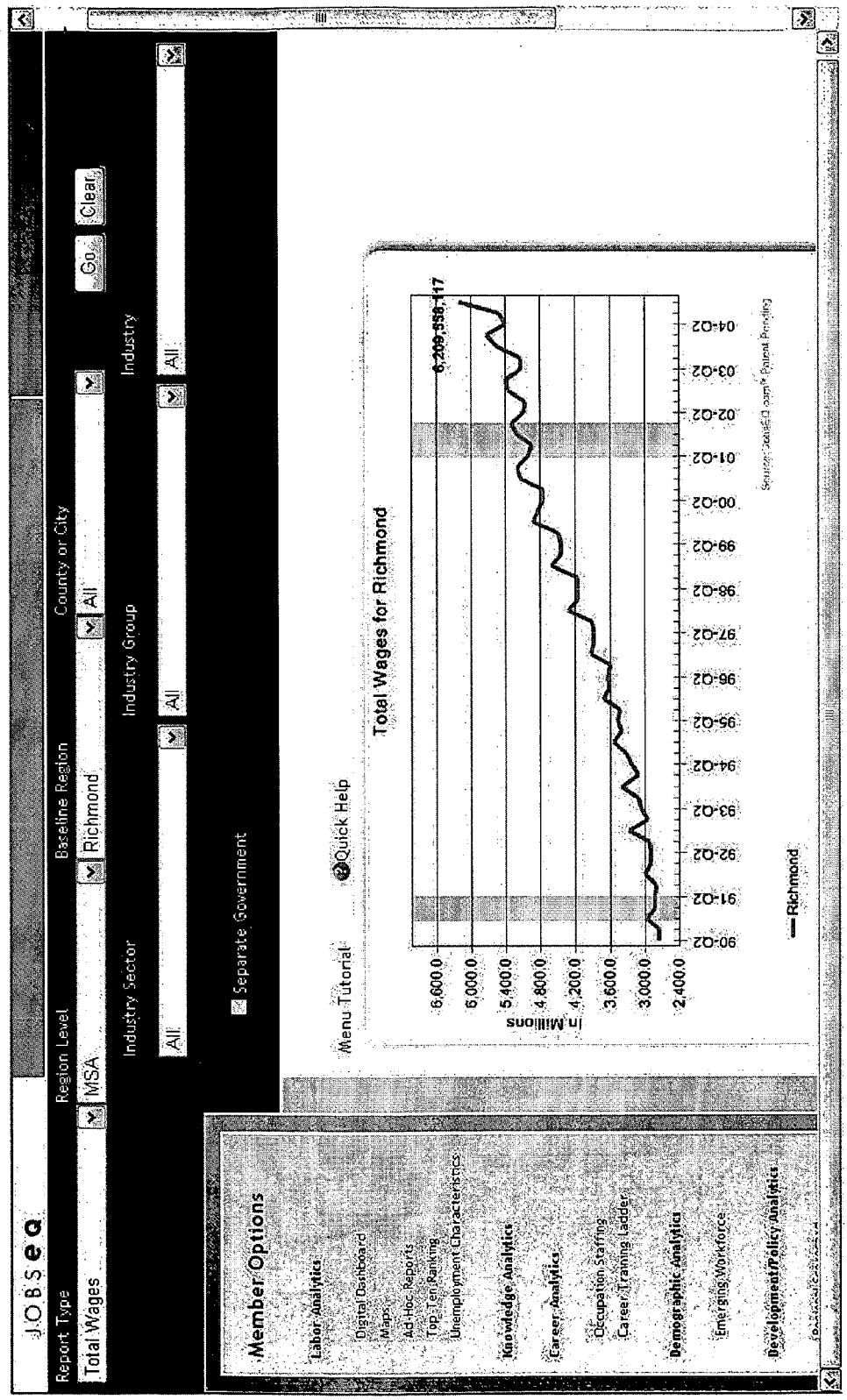
FIG. 13 is a screenshot of the "Total Wages" screen to which a user is taken after clicking on the "Total Wages" chart on the "Digital Dashboard" shown in FIGS. 8, 9 and 10.

FIG. 13 is a screenshot of the "Total Wages" screen to which a user is taken after clicking on the "Total Wages" chart on the "Digital Dashboard" shown in FIGS. 8, 9 and 10. From the total wages drilldown screen shown in FIG. 11, a user can select a particular: "Report Type", "Region Level", "Baseline Region", "County or City", "Industry Sector", "Industry Group" and "Industry". These choices are made using pull down menus in the upper portion of the screen. In FIG. 12, these choices are represented by the flow chart blocks shown in the upper portion of the figure. When a user selects "Total Wages", he is presented with a series of pull down menu choices represented by the diamond shaped blocks in the upper portion of FIG. 12. Menu choices available in each category are consistent with previously made menu choices. Thus, the menus are "intelligent" and do not allow the user to attempt to assemble data that are not logically consistent. After the menu choices are made that specify "Industry Sector", "Region", etc., at block "Stored Data SQL" data are retrieved from database 112. The data are processed in accordance with "Stored Procedures" and transformed into time series data which are then graphed for presentation to the user. Specifically, a structured query language (SQL) query is used to transform the data from the format stored in the JobsEQ™ database into time-series data.

The "Total Wages" data displayed is quarterly (that is, the total wages earned in a region over the course of a given quarter). Recessions are identified by shading. Total wages are the broadest indicator of the total wealth of a region. Changes in total wealth measure the degree to which a region's standard of living is changing. The Total Wages chart can be used to track trends in wealth creation across all industries or in specific industries. Information obtained from the Total Wages charts, along with the Percent Change in Employment and Annual Average Wages per Worker charts, provides insight to questions such as: Are total wages rising because of average wage growth, employment growth, or both? Are living standards in a given region increasing in tandem with other regions? How reliant on a particular industry is a region? Which industries are contributing the most to wealth creation?

Figure 14:
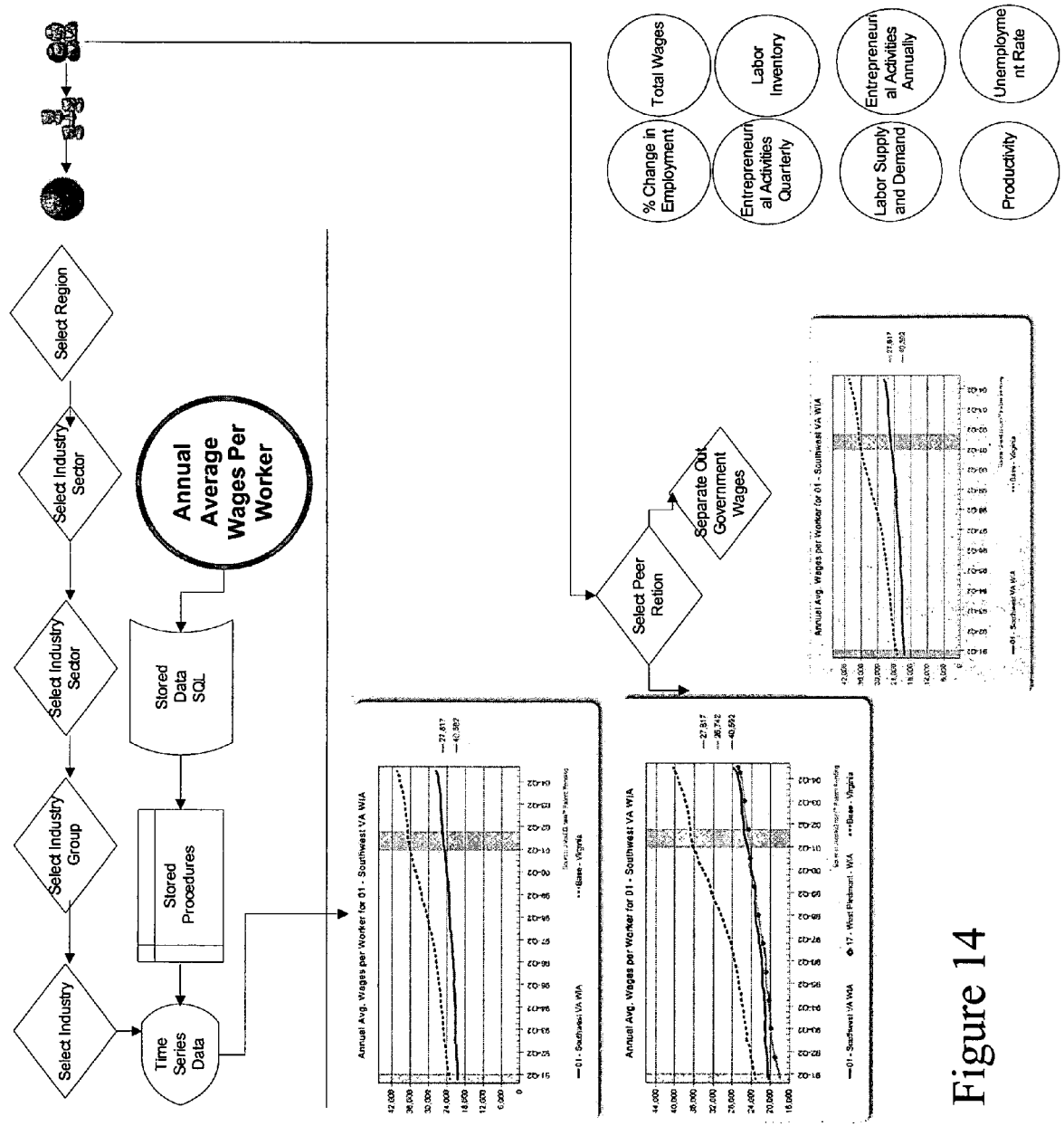
FIG. 14 shows an example of how a user obtains information related to "Annual Average Wages Per Worker". The region's relative individual wealth creation can be analyzed by locale.

FIG. 14 shows an example of how a user obtains information related to "Annual Average Wages Per Worker". A user can "drill down" into the data stored in database 112 and retrieve data related to average annual wages per worker relating to a particular geographical region, a particular industry sector, a particular industry group and a particular industry. As with "Total Wages" the user can begin by making choices from the "Jobs EQ™ Digital Dashboard" which is shown in screenshots in FIGS. 8, 9 and 10. The user can begin to drill down for "Annual Average Wages Per Worker". The user can select "Region", "Industry Sector", "Industry Group" and "Industry". These choices are made using pull down menus in the upper portion of the screen. In FIG. 14, these choices are represented by the flow chart blocks shown in the upper portion of the figure. When a user selects "Annual Average Wages Per Worker", he is presented with a series of pull down menu choices represented by the diamond shaped blocks in the upper portion of FIG. 10. Menu choices available in each category are consistent with previously made menu choices. Thus, the menus are "intelligent" and do not allow the user to attempt to assemble data that is not logically consistent. After the menu choices are made that specify "Industry Sector", "Region", etc., at block "Stored Data SQL" data are retrieved from database 112. The data are processed in accordance with "Stored Procedures" and transformed into time series data which are then graphed for presentation to the user. Specifically, a structured query language (SQL) query is used to transform the data from the format stored in the JobsEQ™ database into time-series data.

The chart displays the annual average wages per worker over time. Information is shown for the selected region, the state, and the peer (if applicable). This chart can also be specialized for a specific industry as chosen through the selection criteria. The data displays quarterly changes. Recessions are identified by shading. (See Charts—Menu Bar and Functions for information on chart functionality.) In the illustrated example, as of the first quarter of 2003 the average worker in Southwest Virginia was making $26,299 a year. The average worker in the state of Virginia was making $37,924. These figures represent the total wages and salaries (including some stock options that were exercised) in the region divided by the total number of workers in that region.

Chart Applications

To measure the relative average individual wealth growth of a region, which reflects changes in living standards.

To identify industries making the greatest contribution to relative individual wealth.

To analyze historical trends.

By selecting areas within a region, the region's relative individual wealth creation can be analyzed by locale.

Figure 15:
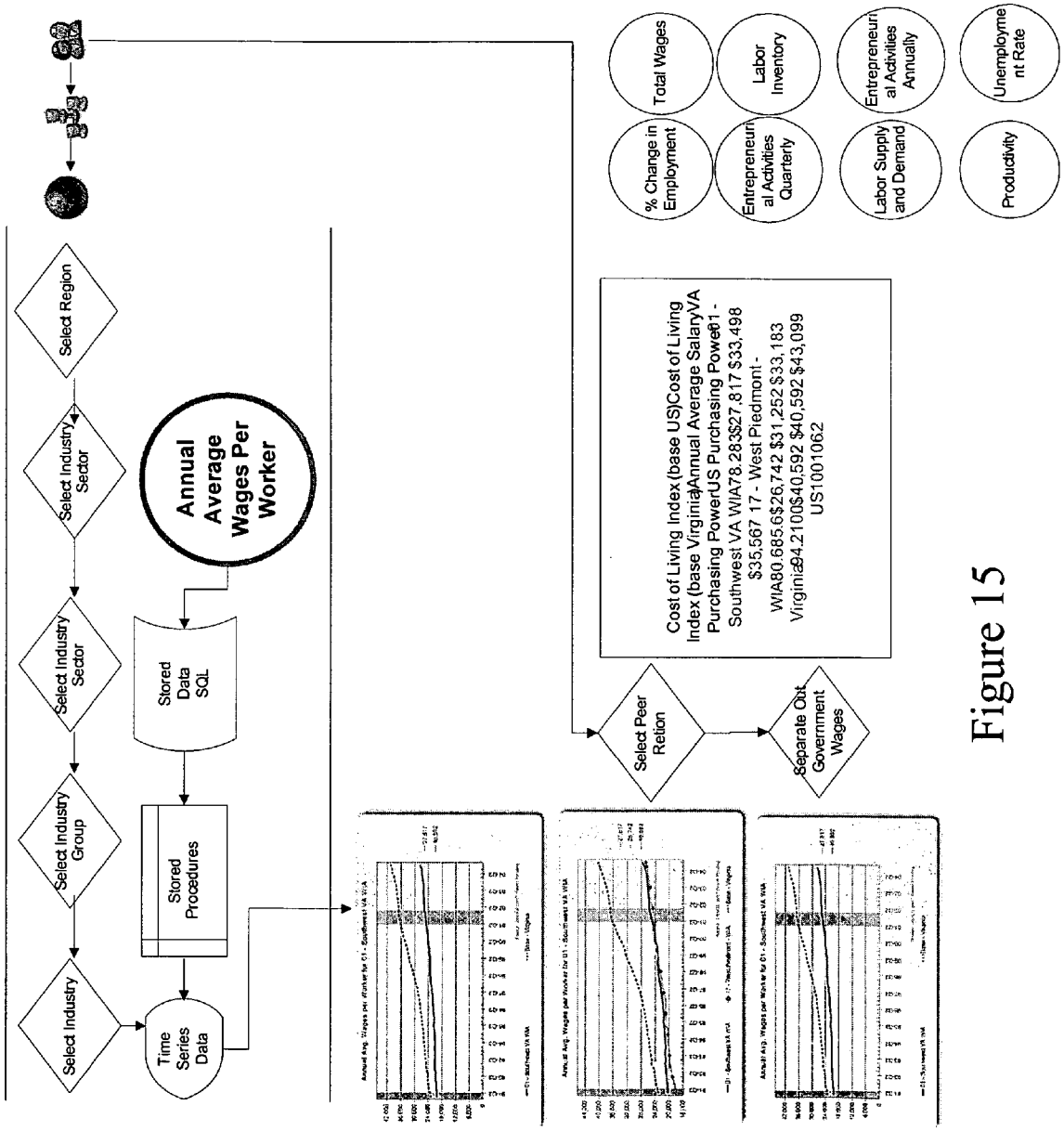
FIG. 15 shows an example of how a user can drill down to obtain cost of living information.

FIG. 15 shows an example of how a user can drill down to obtain cost of living information. This information is found in a table below the chart that displays the annual average wages per worker over time. Information is shown for the selected region, the state, and the peer (if applicable). This table showing cost of living adjusted wages and salaries can also be specialized for a specific industry as chosen through the selection criteria. The data in the table displays the cost of living adjusted wages and salaries for the latest quarter of data available. The Cost of Living Index estimates the relative price levels for consumer goods and services. When applied to wages and salaries, the result is a measure of relative purchasing power. This table displays information for the selected region, its peer (if applicable), the state, and the nation.

|  | Cost of Living Index (base US) | Cost of Living Index (base Virginia) | Annual Average Salary | VA Purchasing Power | US Purchasing Power |
| --- | --- | --- | --- | --- | --- |
| 01 - Southwest VA W1A | 78.2 | 83.0 | $26,298 | $31,669 | $33,625 |
| 17 - West Piedmont W1A | 80.6 | 85.6 | $25,903 | $30,273 | $32,143 |
| Virginia | 94.2 | 100.0 | $37,924 | $37,924 | $40,266 |
| US | 100.0 | 106.2 |  |  |  |

This table enables the user to estimate the relative cost of labor in Virginian regions that is attributable to cost of living differences. For example:

Using the numbers in the above table, we find that it is 17.0% less expensive to live in WIAOne than the average Virginia county or city. As a result, the lower wages paid in WIAOne can be stretched further because residents in WIA-One tend to pay lower prices for many goods and services as well as rents and mortgage payments. Because of the lower cost of living, an individual in WIAOne earning $26,298 has the same purchasing power as the average Virginia resident that earns $31,669. Thus, if a WIAOne resident earning $26,298 per year decided to move out of the area and into a typical state county, that individual would need to earn $31,669 to maintain their standard of living.

Figure 16:
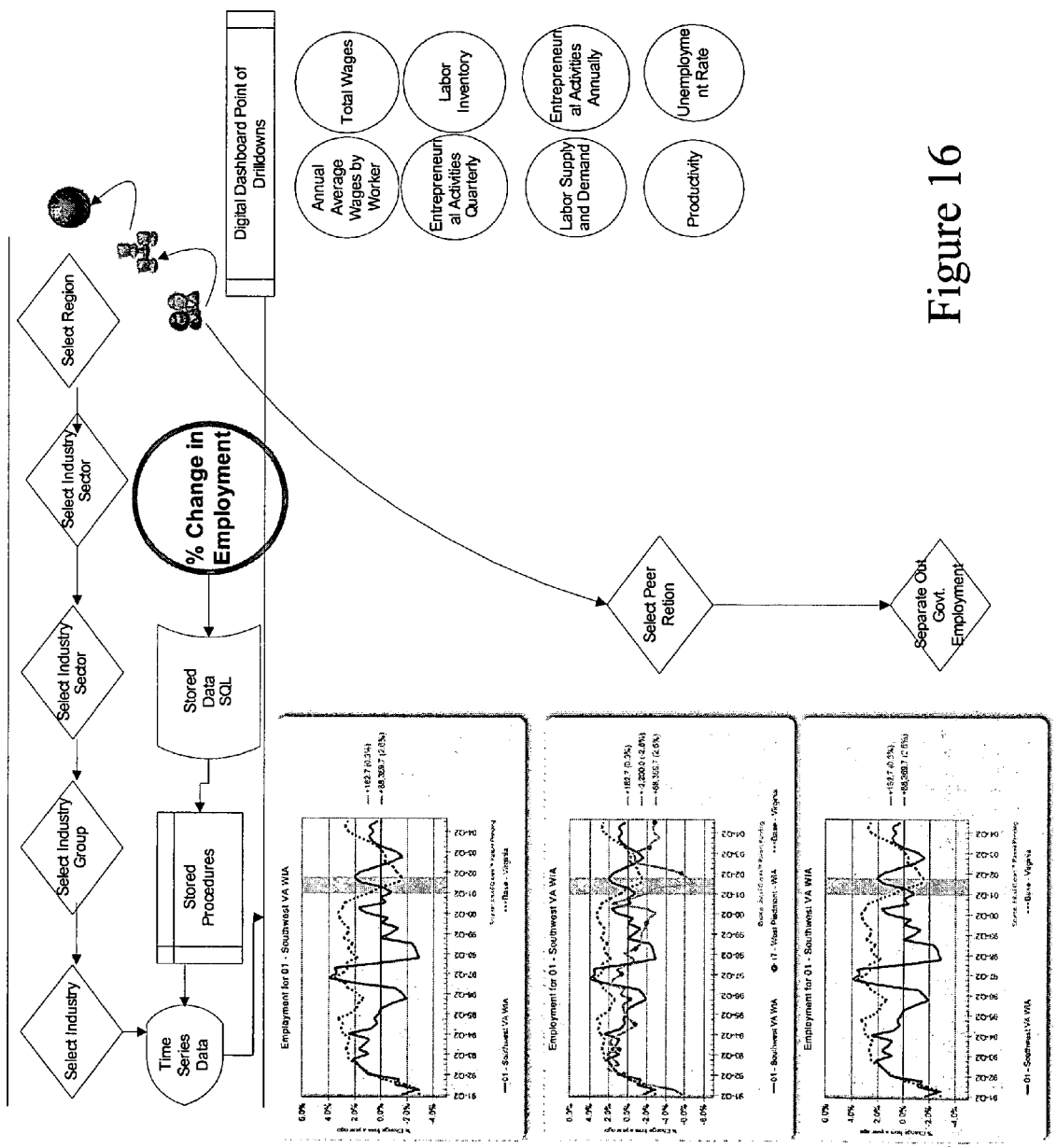
FIG. 16 shows an example of how a user obtains information reflecting the percentage change in employment.

FIG. 16 shows an example of how a user obtains information reflecting the percentage change in employment. This chart displays the percentage change in employment over time. Information is shown for the selected region, the state, and the peer (if applicable). The second chart in FIG. 14 shows that three trend lines appear when 'peer' is chosen. The 'peer' is a region pre-determined by the client or chosen based on analytics in JobsEQ™ that identifies a peer based on the region's population size, industry mix, and ruralness. This chart can also be specialized for a specific industry as chosen through the selection criteria. The third chart shows total employment where government institutions are not included in the total. For example, state or federal hospitals would not be included in total employment if the 'separate out government' box is checked by the user. The data displays quarterly changes. Recessions are identified by shading. (See Charts—Menu Bar and Functions for information on chart functionality.)

Chart Applications

Are some regions facing a greater decline in employment than others?

Which industries are posting the largest increases or decreases in employment?

Are changes in employment levels cyclical?

How is employment affected by recession periods?

Figure 17:
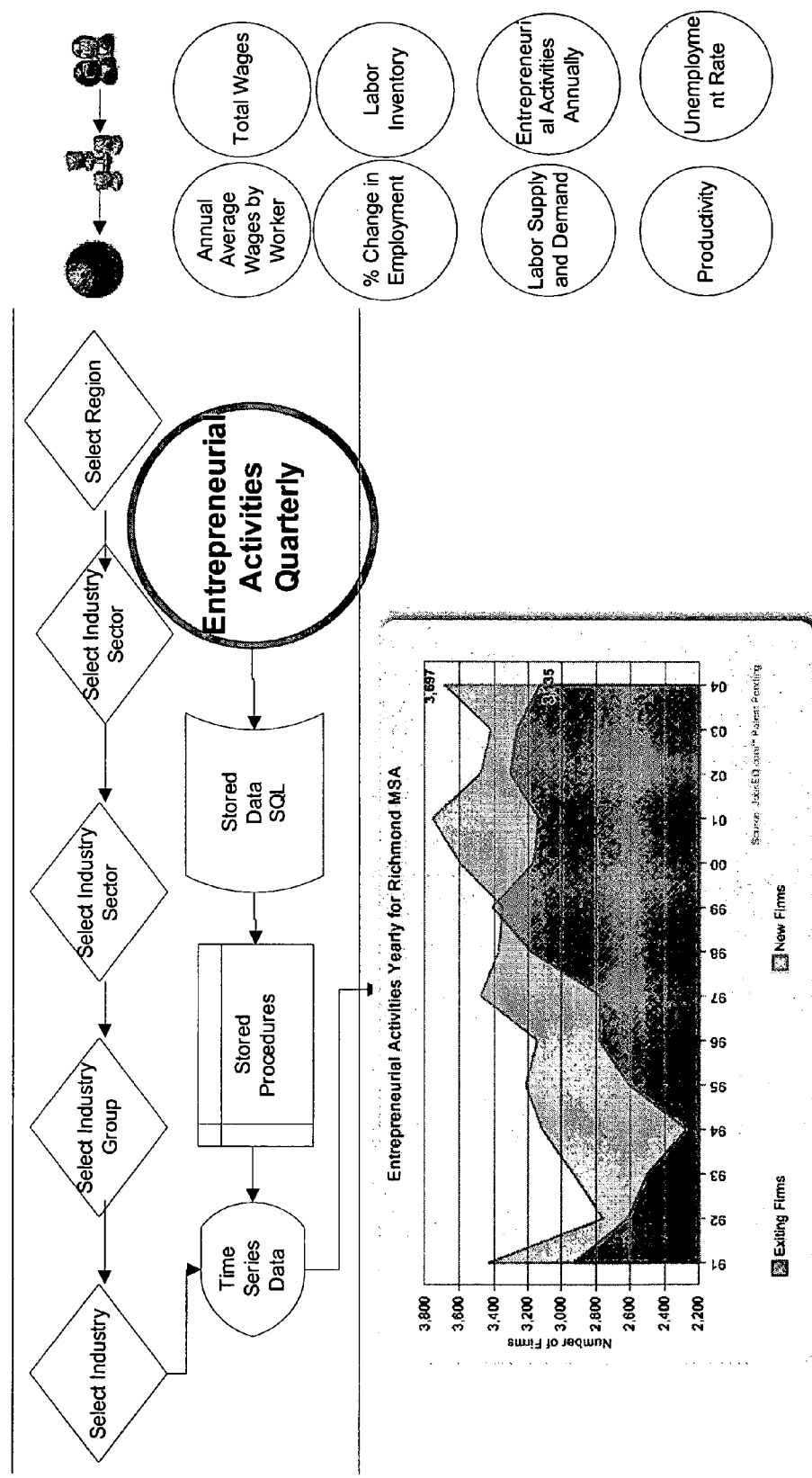
FIG. 17 shows an example of how a user obtains information regarding quarterly entrepreneurial activity.

FIG. 17 shows an example of how a user obtains information regarding quarterly entrepreneurial activity. These choices are represented by the flow chart blocks shown in the upper portion of the figure. When a user selects "Quarterly Entrepreneurial Activity", he is presented with a series of pull down menu choices represented by the diamond shaped blocks in the upper portion of FIG. 10. Menu choices available in each category are consistent with previously made menu choices. Thus, the menus are "intelligent" and do not allow the user to attempt to assemble data that is not logically consistent. After the menu choices are made that specify "Industry Sector", "Region", etc., at block "Stored Data SQL" data are retrieved from database 112. The data are processed in accordance with "Stored Procedures" and transformed into time series data which are then graphed for presentation to the user.

Specifically, a structured query language (SQL) query is used to transform the data from the format stored in the JobsEQ™ database into time-series data.

For the selected criteria, this chart will display the historical number of exiting and entering entrepreneurial firms in a region by quarter.

The following are definitions of terms used herein:

Entrepreneurial firms—firms with ten or fewer employees (also referred to as 'small businesses')

Exiting firms—entrepreneurial firms that shut down operations or leave the specified region during a time period New firms—entrepreneurial firms beginning operations during a time period (including those entering a specified region)

The Entrepreneurial Activities chart can be specialized by region, industry, or occupation (see Analytic Comparison). When drill-down by occupation is selected, the chart will display information on entrepreneurial firms that use that occupation. (See Charts—Menu Bar and Functions for information on chart functionality.)

Applications

This chart can be used to gauge the innovative capacity of a regional economy in terms of small business activity. Innovative capacity is a region's ability to innovate and adapt to changing market conditions. One method of analysis is to look for 'cross-over points'—the points in time at which the number of exiting firms equals the number of entering firms. These points can be found on the charts by identifying all points at which the blue and green lines intersect. Points at which the exiting firms begin to exceed the number of entering firms portend employment decline and further deterioration. When the reverse is true and new firms begin to outpace exiting firms, economic growth is more likely. Because this chart is not seasonally adjusted, the data may display a large number of spikes. More ease of analysis may be obtained with annual data found in Entrepreneurial Activities Yearly, also found on the digital dashboard. Information obtained from the Entrepreneurial Activities Quarterly graphs provide insight to questions such as:

Does the region exhibit high innovative capacity?

Does the number of small firms exiting exceed the number of small firms entering?

How does the influx and outflow of firms relate to recession periods?

Which industries exhibit greater innovative capacity?

Figure 18:
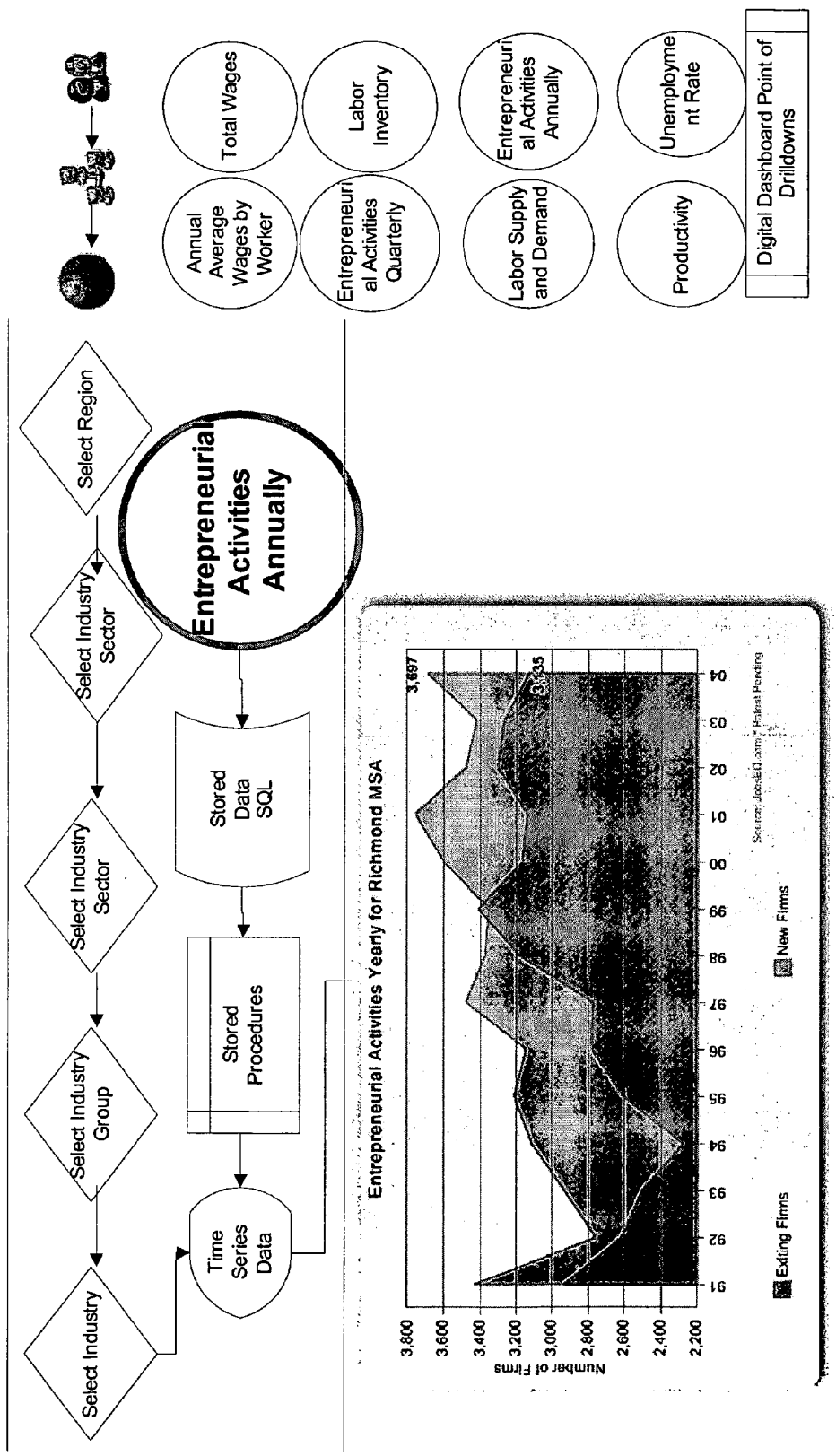
FIG. 18 shows an example of how a user obtains information regarding annual entrepreneurial activity.

FIG. 18 shows an example of how a user obtains information regarding annual entrepreneurial activity. For the selected criteria, this chart will display the historical number of exiting and entering entrepreneurial firms in a region by year. These choices are represented by the flow chart blocks shown in the upper portion of the figure. When a user selects "Annual Entrepreneurial Activity", he is presented with a series of pull down menu choices represented by the diamond shaped blocks in the upper portion of FIG. 10. Menu choices available in each category are consistent with previously made menu choices. Thus, the menus are "intelligent" and do not allow the user to attempt to assemble data that is not logically consistent. After the menu choices are made that specify "Industry Sector", "Region", etc., at block "Stored Data SQL" data are retrieved from database 112. The data are processed in accordance with "Stored Procedures" and transformed into time series data which are then graphed for presentation to the user. Specifically, a structured query language (SQL) query is used to transform the data from the format stored in the JobsEQ™ database into time-series data.

The Entrepreneurial Activities chart can be specialized by region, industry, or occupation (see Analytic Comparison). When drill-down by occupation is selected, the chart will display information on entrepreneurial firms that use that occupation. (See Charts—Menu Bar and Functions for information on chart functionality.)

Applications

This chart can be used to gauge the innovative capacity of a regional economy in terms of small business activity. Innovative capacity is a region's ability to innovate and adapt to changing market conditions. One method of analysis is to look for 'cross-over points'—the points in time at which the number of exiting firms equals the number of entering firms. These points can be found on the charts by identifying all points at which the blue and green lines intersect. Points at which the exiting firms begin to exceed the number of entering firms portend employment decline and further deterioration. When the reverse is true and new firms begin to outpace exiting firms, economic growth is more likely. Information obtained from the Entrepreneurial Activities Yearly graphs provide insight to questions such as:

Does the region exhibit high innovative capacity?
Does the number of small firms exiting exceed the number of small firms entering?
How does the influx and outflow of firms relate to recession periods?
Which industries exhibit greater innovative capacity?

Figure 19:
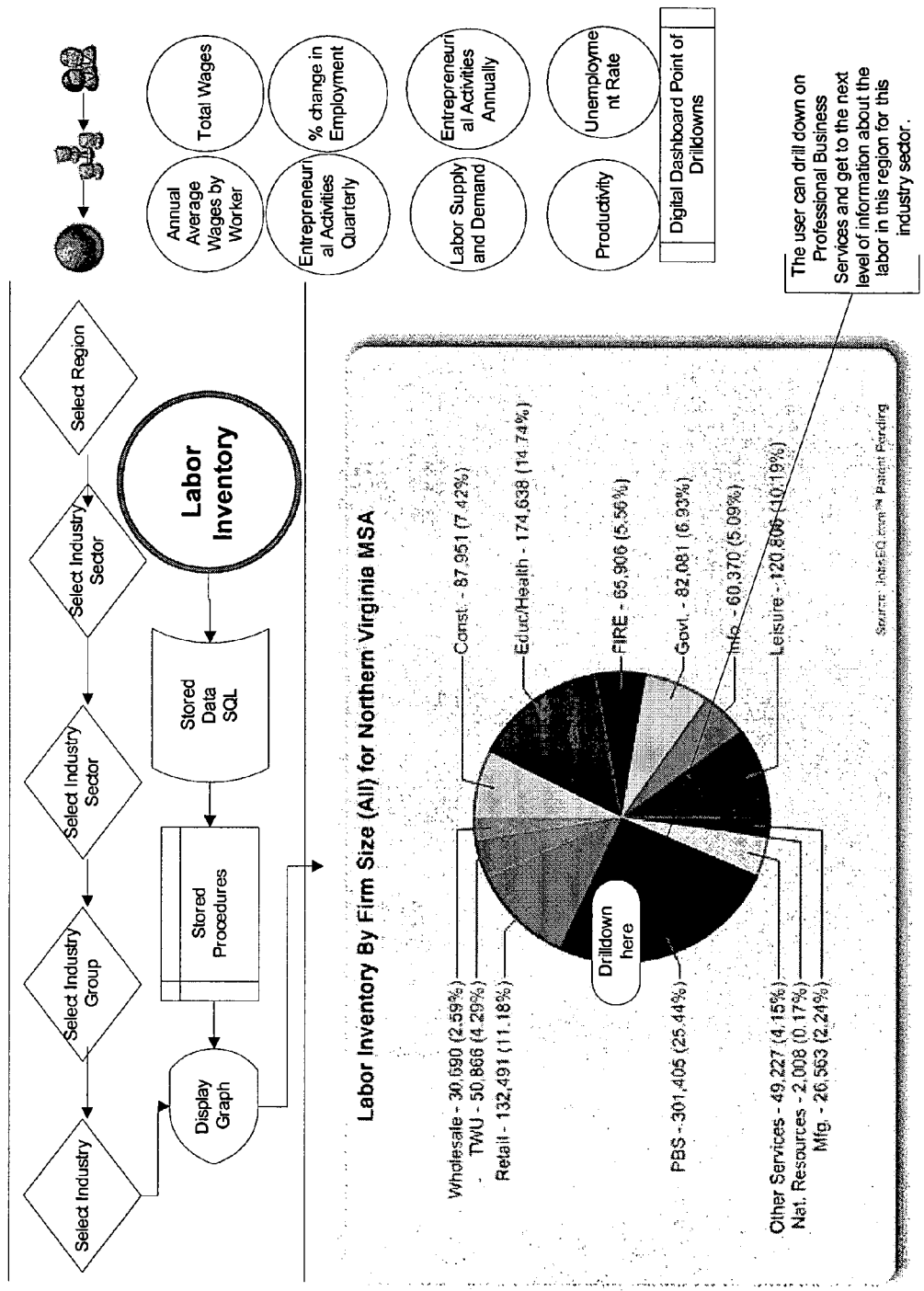
FIG. 19 shows an example of how a user obtains information regarding labor inventory.

FIG. 19 shows an example of how a user obtains information regarding labor inventory. The Labor Inventory tool, found on the digital dashboard, provides information on the composition of the workforce in a given region as well as detailed information on any given occupation. The following charts and tables are available in this tool (with applications listed below):

Labor Inventory Charts—the initial chart shows
% of workforce by industry in a given region
% of workforce by firm size
% of workforce by industry and given firm size
Employment by Occupation Chart (see FIG. 20)—obtained by clicking on an industry slice of the Labor Inventory by Industry Chart (Labor Inventory Charts shown in FIG. 17)
% employment by occupation within an industry. Average Wages by Industry & Employment Occupation by Detail (see FIG. 21)—obtained by clicking on an occupation slice of the Employment by Occupation Chart (see FIG. 20) average wages in a region by industry % employment by minor occupation. An Occupation Profile (see FIG. 22) is obtained by clicking on a slice of the Employment Occupation by Detail Chart. Occupation attributes are broken down by knowledge, skills, ability, and activity.

Figure 20:
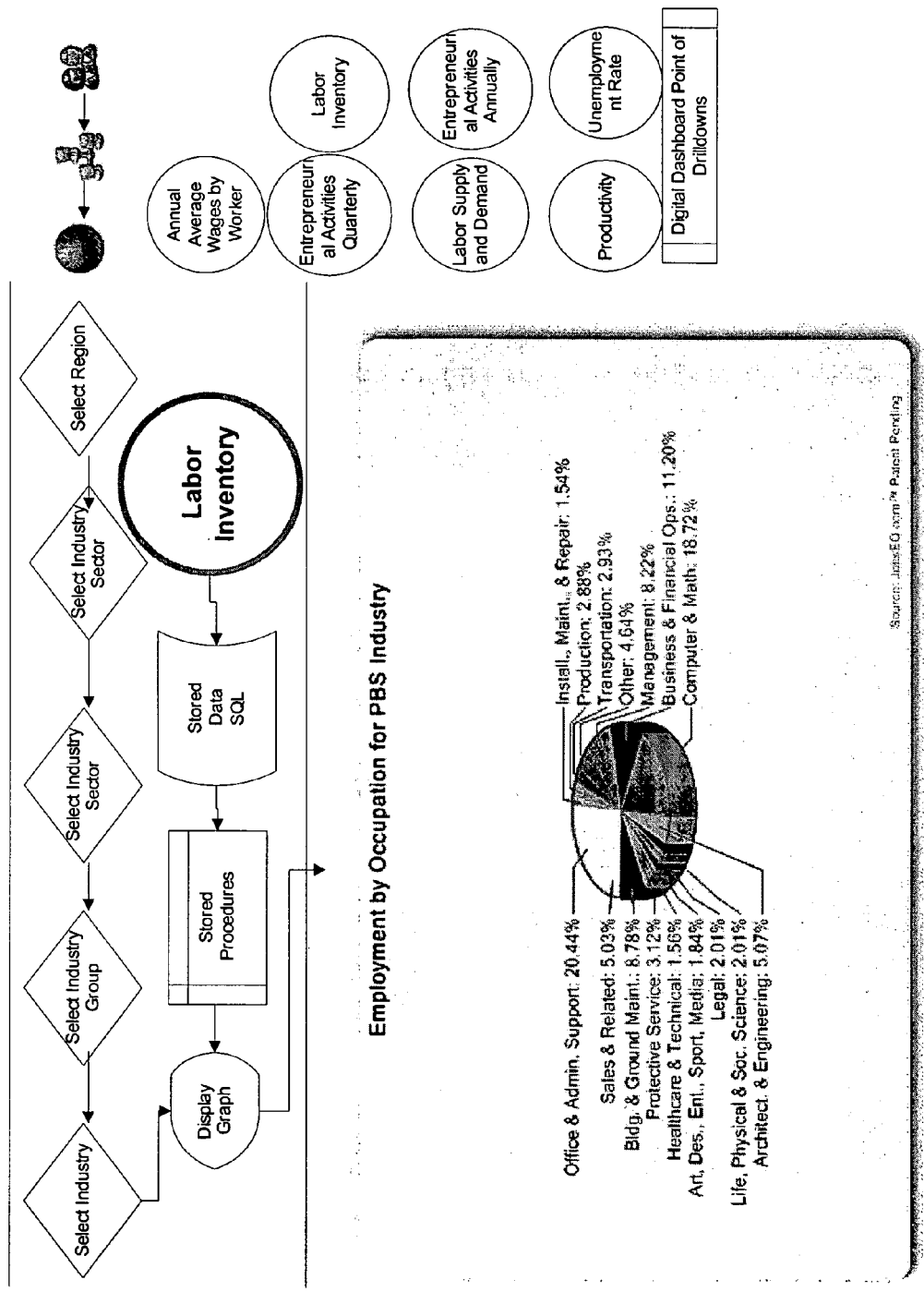
FIG. 20 shows an example of a first drill down for more detailed labor inventory data.

FIG. 20 shows an example of a first drill down for more detailed labor inventory data. The Labor Inventory tool, found on the digital dashboard, provides information on the composition of the workforce in a given region as well as detailed information on any given occupation. The following charts and tables are available in this tool (with applications listed below):

Labor Inventory Charts—the initial charts shown
% of workforce by industry in a given region
% of workforce by firm size
% of workforce by industry and given firm size
Employment by Occupation Chart—obtained by clicking on an industry slice of the Labor Inventory by Industry Chart (Labor Inventory Charts)
% employment by occupation within an industry
Average Wages by Industry & Employment Occupation by Detail—obtained by clicking on an occupation slice of the Employment by Occupation Chart
average wages in a region by industry
% employment by minor occupation
Occupation Profile is obtained by clicking on a slice of the Employment Occupation by Detail Chart. Occupation attributes are broken down by knowledge, skills, ability, and activity.

Figure 21:
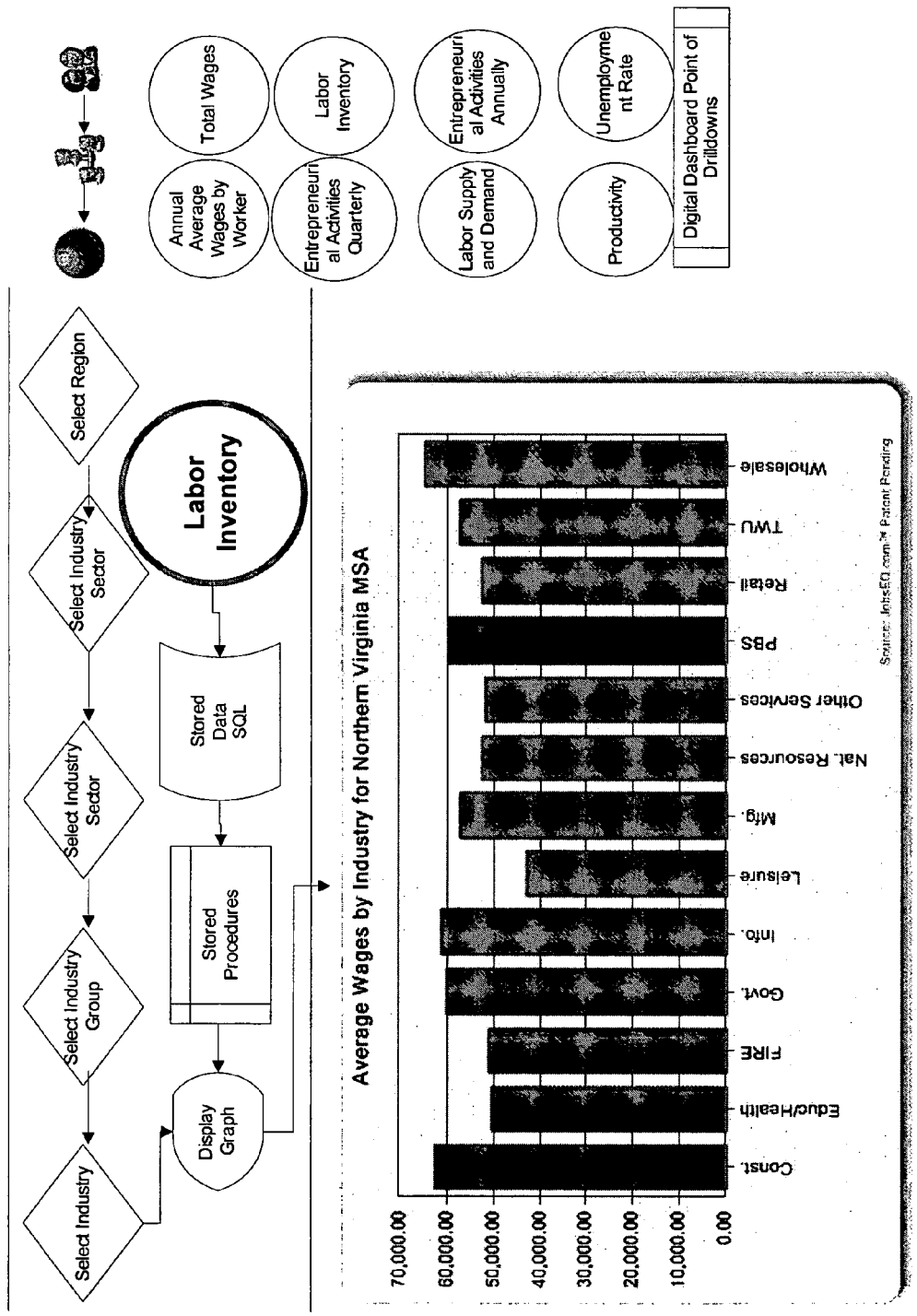
FIG. 21 shows an example of a second drill down for more detailed labor inventory data.

FIG. 21 shows an example of a second drill down for more detailed labor inventory data. An Average Wages by Industry chart is obtained by drilling down through the Labor Inventory by Industry Chart and the Employment by Occupation Chart. This chart displays the average wages for industries in a given region. The specific industry selected in the drill-down process will be highlighted.

Figure 22:
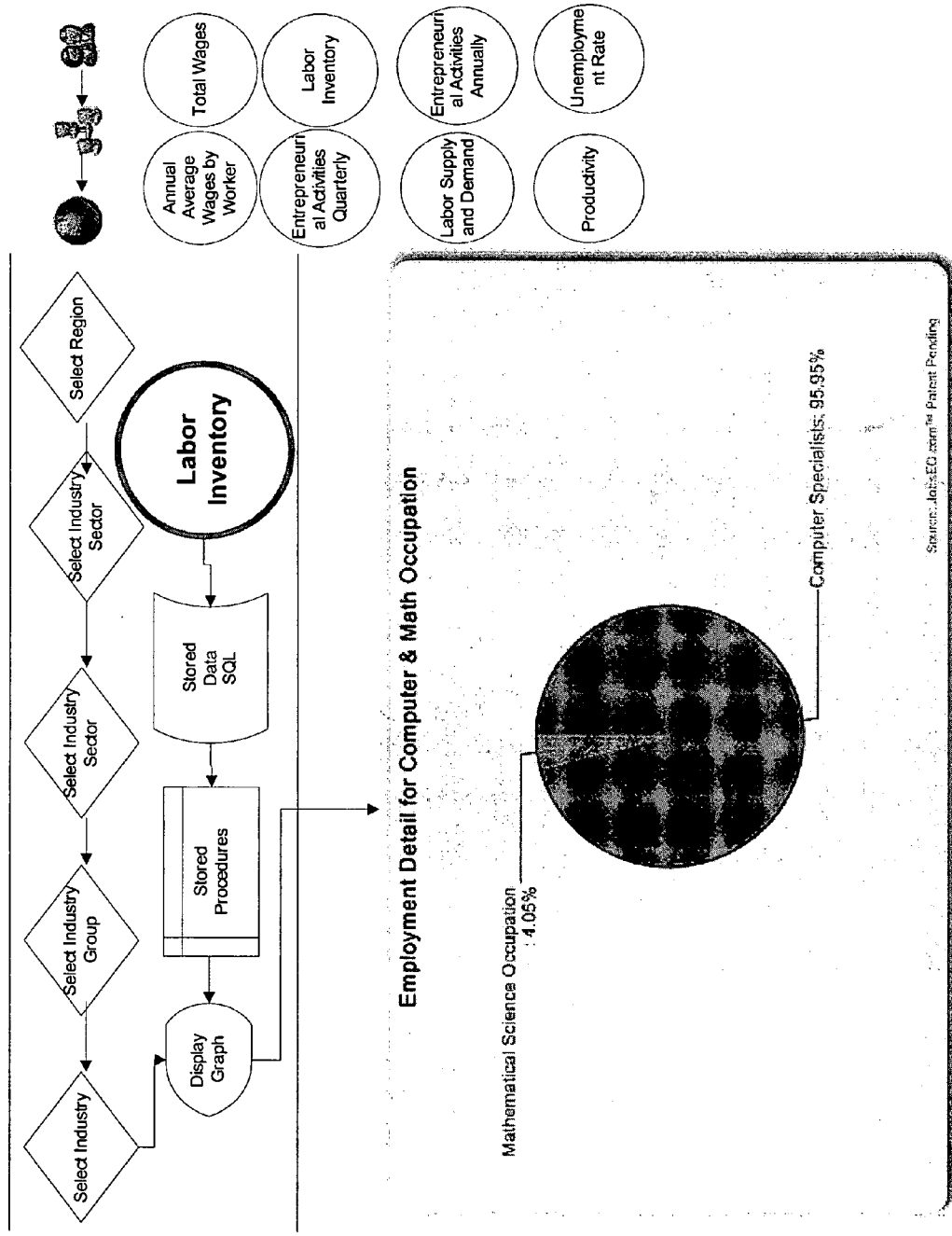
FIG. 22 shows an example of part two of a labor inventory data drilldown.

FIG. 22 shows an example of part two of a labor inventory data drilldown. A chart of Employment Detail for Occupations is obtained by drilling down through the Labor Inventory by Industry Chart and the Employment by Occupation Chart. This chart displays the mix of workers within the selected occupation broken down by minor occupation group. By clicking on one of the minor occupation groups in this chart, the user obtains access to the Occupation Profile.

Figure 23:
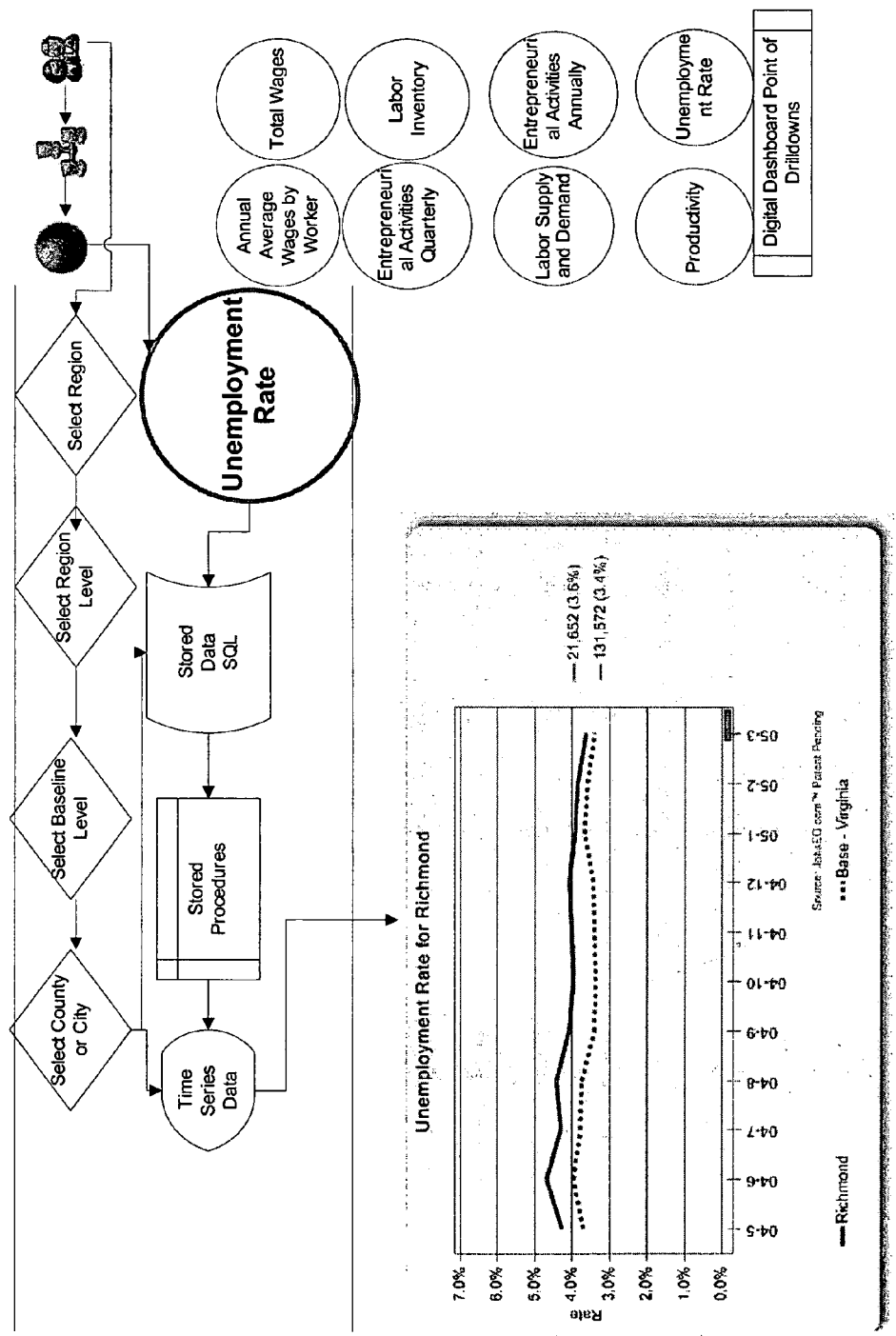
FIG. 23 shows an example of data retrieval related to the unemployment rate drilldown. These choices are represented by the flow chart blocks shown in the upper portion of the figure.

FIG. 23 shows an example of data retrieval related to the unemployment rate drilldown. These choices are represented by the flow chart blocks shown in the upper portion of the figure. When a user selects "Unemployment Rate", he is presented with a series of pull down menu choices represented by the diamond shaped blocks in the upper portion of FIG. 12. Menu choices available in each category are consistent with previously made menu choices. Thus, the menus are "intelligent" and do not allow the user to attempt to assemble data that is not logically consistent. After the menu choices are made that specify "Industry Sector", "Region", etc., at block "Stored Data SQL" data are retrieved from database 112. The data are processed in accordance with "Stored Procedures" and transformed into time series data which are then graphed for presentation to the user. Specifically, a structured query language (SQL) query is used to transform the data from the format stored in the JobsEQ™ database into time-series data.

The Unemployment Rate chart, found on the digital dashboard, displays the percentage of the labor force that is unemployed. The unemployment rate is determined by dividing the total number of unemployed workers by the total labor force. The total labor force is the sum of both the employed workers and the unemployed workers. This chart displays data for the selected region, the state, and the peer (if applicable). (See selection criteria regarding the selection process.) Unemployment data by industry can be obtained via an Ad-Hoc Report. The data displayed are monthly. Recessions are identified by shading. (See Charts—Menu Bar and Functions for information on chart functionality.) This chart has a built-in scrolling function. The dark scroll bar in the bottom right corner of the chart can be slid along the horizontal axis to view data as far back as 1990.

Applications

In addition to the Percent Change in Employment chart, the Unemployment Rate chart is an alternate measure of the strength or weakness of a region's labor market. High unemployment in a region reflects labor market weakness. However, the unemployment chart should be used with caution. For instance, a declining unemployment rate may reflect the fact that the labor force is declining (people are leaving the region) rather than an improving labor market. In addition, the unemployment rate is considered a less reliable measure than changes in employment because the unemployment rate is derived mainly from surveys while employment figures are obtained from tax filings representing 98% of all employed. This chart can be also used to monitor unemployment rate trends to determine whether a region is susceptible to business cycle trends (cyclical unemployment) or industrial trends (structural unemployment). Cyclical unemployment is associated with a shift in the business cycle that causes a downturn in economic activity (i.e., a recession). In contrast, structural unemployment arises when employer's needs do not match workforce skills, education, or training. Information obtained from the Unemployment chart provides insight to questions such as:

Does the region exhibit higher or lower unemployment than the state?

Does the region's unemployment trend (increases and decreases) mirror the states?

How has unemployment been affected by recession periods?

Are any unemployment trends in evidence?

Figure 24:
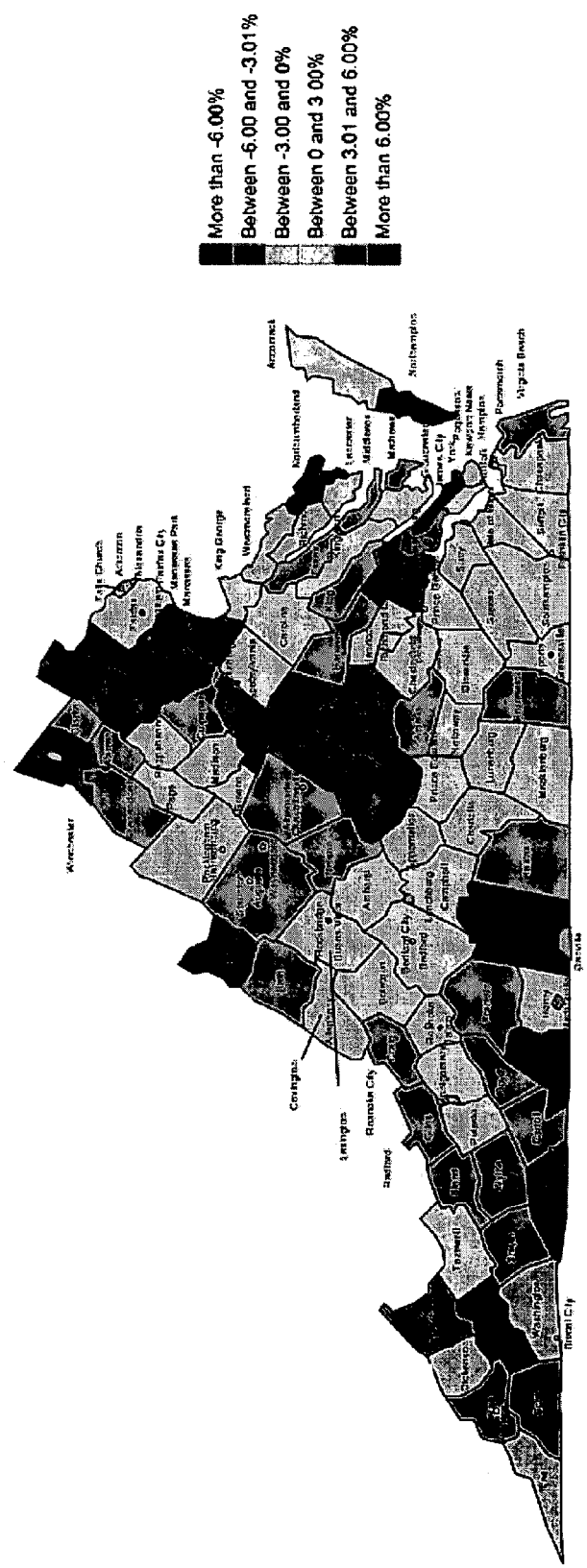
FIG. 24 illustrates the production of a map showing percentage change in employment from a year ago.

FIG. 24 illustrates the production of a map showing % change in employment from a year ago. The Percentage Change in Employment maps identifies employment gains or losses for all counties and cities in a state. The user can choose from two time-period options: From Last Quarter and From Last Year. (The From Last Quarter changes are not seasonally adjusted.) This figure is illustrative of the system's mapping capability. Map templates can be "stuffed" with data mined from database 112 in answer to various queries and displayed in this user friendly manner.

As a second example (not illustrated) one could produce a map showing the unemployment rate. The Unemployment Rate map displays the percentage of the labor force that is unemployed in the counties in Virginia. The unemployment rate is determined by dividing the total number of unemployed workers by the total labor force. The total labor force is the sum of both the employed workers and the unemployed workers. All counties and cities in the state are shown when this analytic is chosen.

As a third example (not illustrated) one could produce a map showing commuting in to a region. The Commuting Into a Region map identifies the number of workers that commutes into the region of interest. The region of interest is defined by the user by means of drop down lists that allow for the choice of 'Region Level', 'Baseline Region', and 'County or City'.

Figure 25:
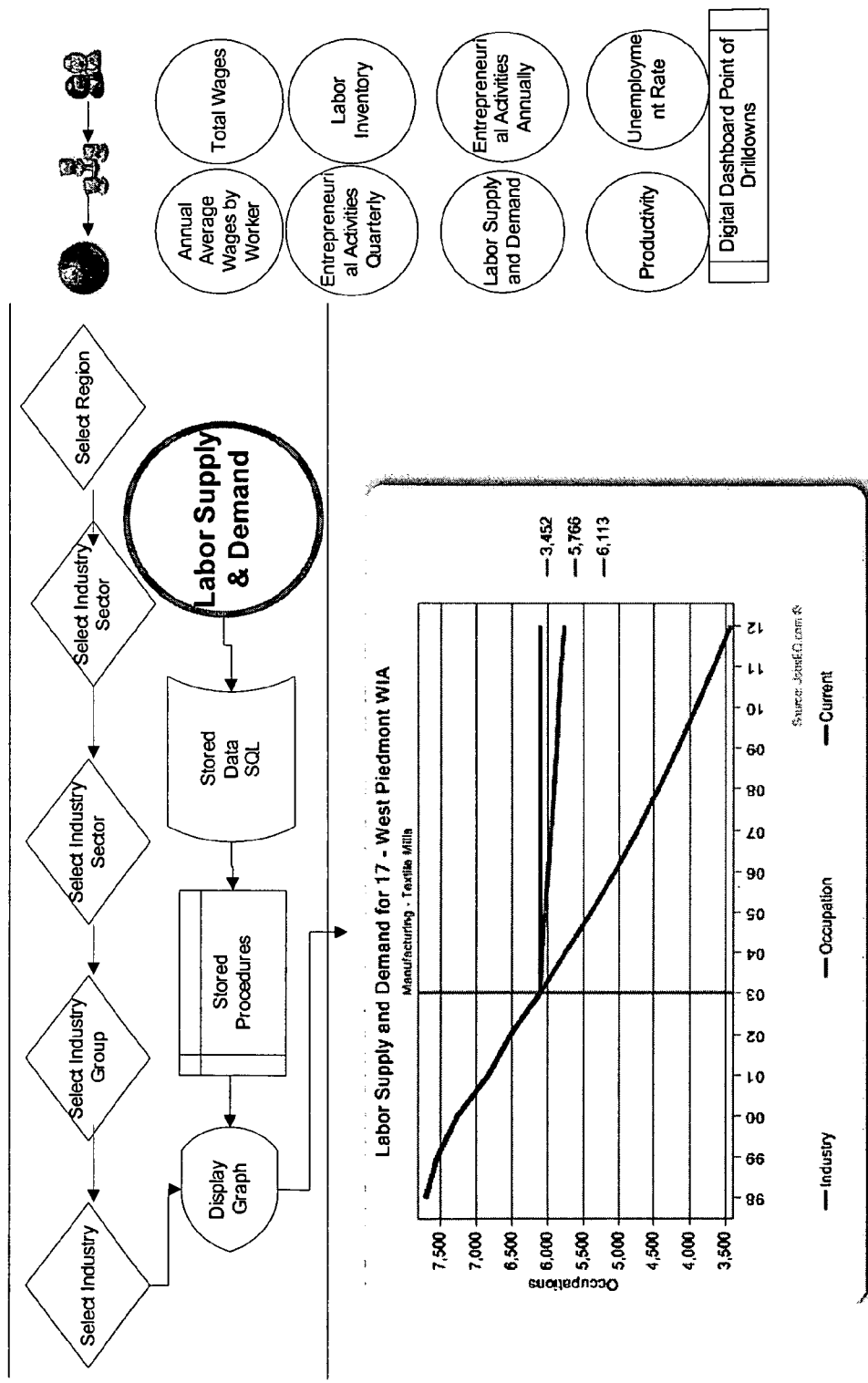
FIG. 25 illustrates the production of a chart showing labor and supply and demand. Menu choices from the web page are represented by the flow chart blocks shown in the upper portion of the figure.

FIG. 25 illustrates the production of a chart showing labor and supply and demand. Menu choices from the web page are represented by the flow chart blocks shown in the upper portion of the figure. When a user selects "Labor Supply and Demand", he is presented with a series of pull down menu choices represented by the diamond shaped blocks in the upper portion of FIG. 10. Menu choices available in each category are consistent with previously made menu choices with the added feature of allowing the using to choose the supply and demand by industry or occupation. Thus, the menus are "intelligent" and do not allow the user to attempt to assemble data that is not logically consistent. After the menu choices are made that specify "Industry Sector", "Region", etc., at block "Stored Data SQL" data are retrieved from database 112. The data are processed in accordance with "Stored Procedures" and transformed into time series data which are then graphed for presentation to the user. Specifically, a structured query language (SQL) query is used to transform the data from the format stored in the JobsEQ™ database into time-series data.

This important tool, found on the digital dashboard, can forecast the supply and demand of labor for a given region. Labor can be analyzed by industry or occupation. Eight different scenarios are offered in this help section to illustrate the interpretations and uses of the typical output graphs.

Industry Drill-Downs:

I. Industry in decline; component occupations faring better

II. Industry in decline; component occupations declining faster

III. Industry in expansion; component occupations trailing

IV. Industry in expansion; component occupations faring better

Occupation Drill-Downs:

V. Regional industries in decline; occupation faring better

VI. Regional industries in decline; occupation declining faster

VII. Regional industries in expansion; occupation trailing

VIII. Regional industries in expansion; occupation faring better

Industry Drill-Downs:

I. Industry in decline; component occupations faring better

In this scenario, employment in an industry is forecast to decline (the green line is falling). Occupations that are employed by that industry, however, are either not forecast to decline as much or are forecast to expand (the red line is above the green line). This scenario is the result of these component occupations also being used in one or more other industries that are either expected to expand employment or at least not contract as rapidly as the selected industry.

Therefore, if a region faces this scenario with an industry forecast to decline, but component occupations are forecast to fare significantly better than the industry (the red line is much higher than the green line), then there may be good prospects for workers in the given industry who will lose their jobs; i.e. there exist healthier industries which also employ their occupation. Some of these prospects, however, may be outside the region). The closer the red line is to the green in this scenario, the fewer prospects for the unemployed job-seeker in the same occupation. The numbers in the right margin of the chart indicate employment represented by each line for the last year of the forecast (above, the year 2012).

II. Industry in decline; component occupations declining faster (Industry drill-down). In this scenario, employment in an industry is forecast to decline (the green line is falling) but the component occupations are forecast to have a steeper decline (the red line is below the green line). This scenario is the result of there being few, if any, industries healthier than the selected industry that employs most of the component occupations. Therefore, if a region contains such an industry, workers in the industry who become unemployed will very likely struggle to find openings for their occupation in another industry.

III. Industry in expansion; component occupations trailing (Industry drill-down). In this scenario, employment in the industry is forecast to expand (the green line is rising). Occupations that are employed by that industry, however, are either not forecast to expand as much or are forecast to decline (the red line is below the green line). This scenario is the result of the given industry growing at an above-average rate for industries that use the component occupations. Such a growing industry would have a high demand for its component occupations. Even though the occupations may be expanding across the nation, even though more workers may be getting trained for these occupations, there is a high chance of a shortage of these occupations in the selected region. The supply will be hard-pressed to keep up with the demand. This potential training gap would carry ramifications to educators as well as practitioners in economic development.

Figure 26:
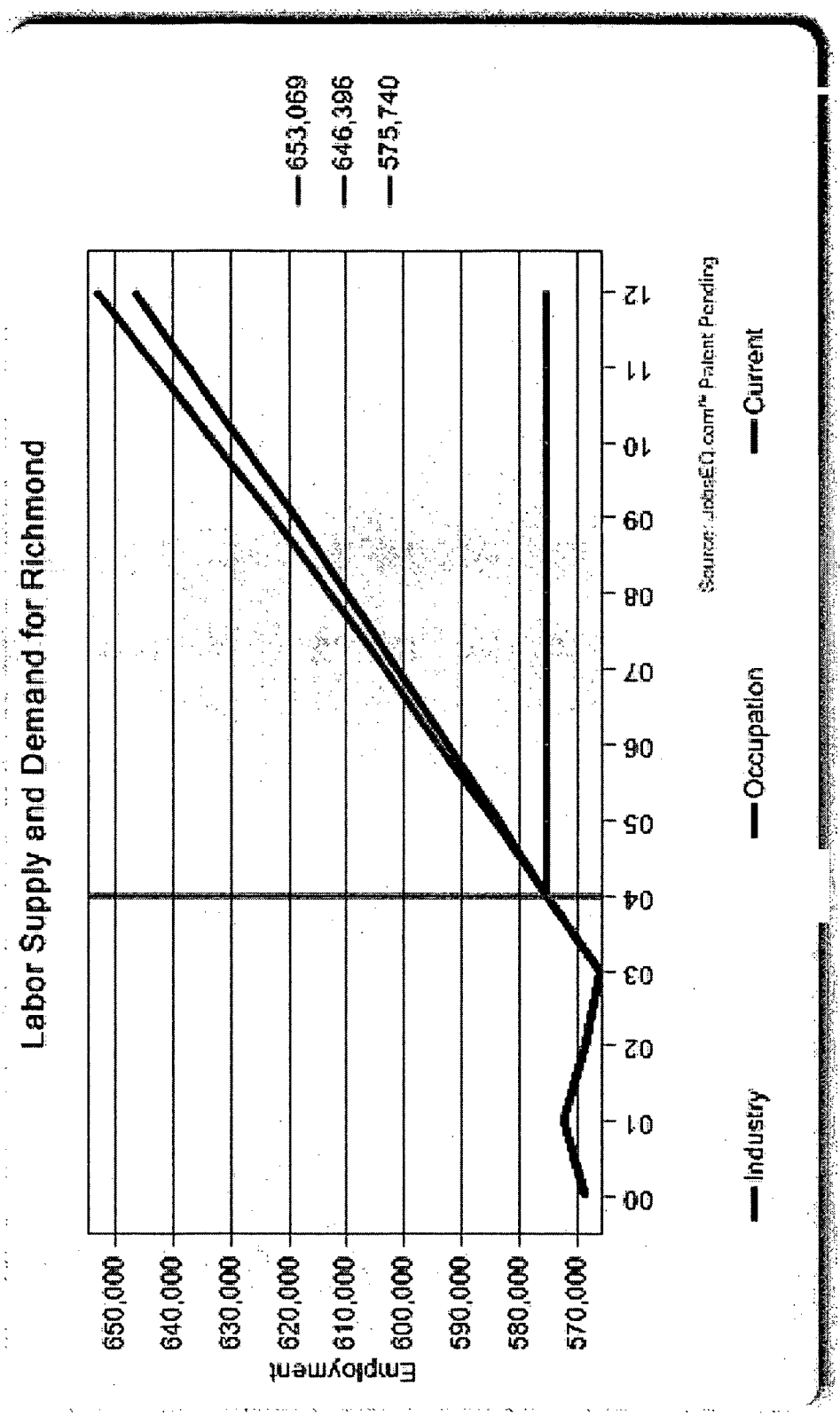
FIG. 26 shows an example of a chart produced to demonstrate "Labor Supply and Demand for Richmond."

FIG. 26 shows an example of a chart produced to demonstrate "Labor Supply and Demand for Richmond."

Figure 27:
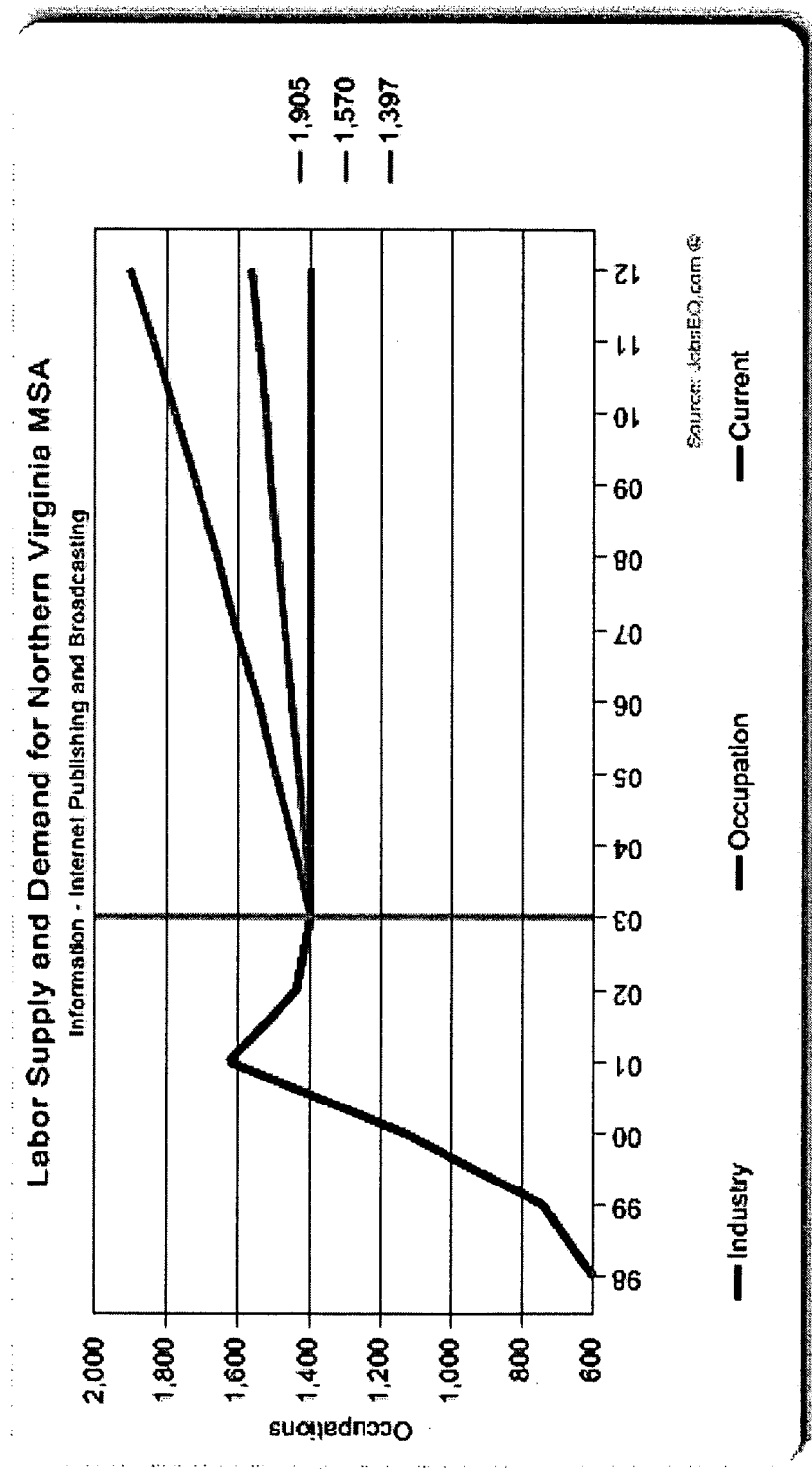
FIG. 27 shows an example of a chart produced to demonstrate "Labor Supply and Demand for the Northern Virginia MSA". Of course the geographical region used is merely exemplary.

FIG. 27 shows an example of a chart produced to demonstrate "Labor Supply and Demand for the Northern Virginia MSA". Of course the geographical region used is merely exemplary.

Figure 28:
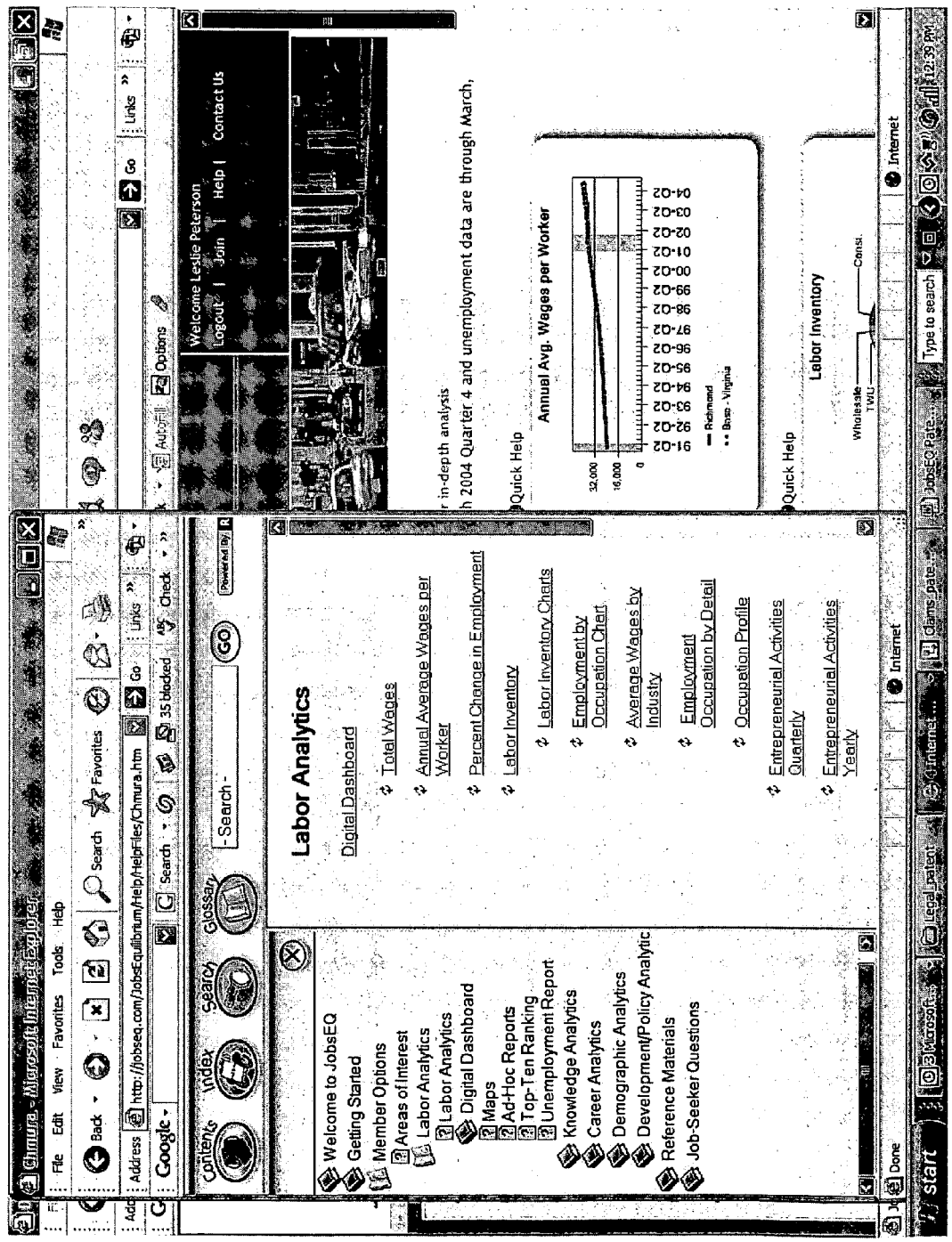
FIG. 28 illustrates the on line help manual available to users.

FIG. 28 illustrates the on line help manual available to users. Users can access the on line help manual by clicking on the question mark (?) above the chart or clicking 'Help' which is found in the upper right hand corner of each screen. The help function explains such items as the analytics found in JobsEQ™, the data sources, and how to apply the analytic. In addition, definitions of occupations, industries and instructional programs can be found by inserting key words in the search box found in the help section.

Figure 29:
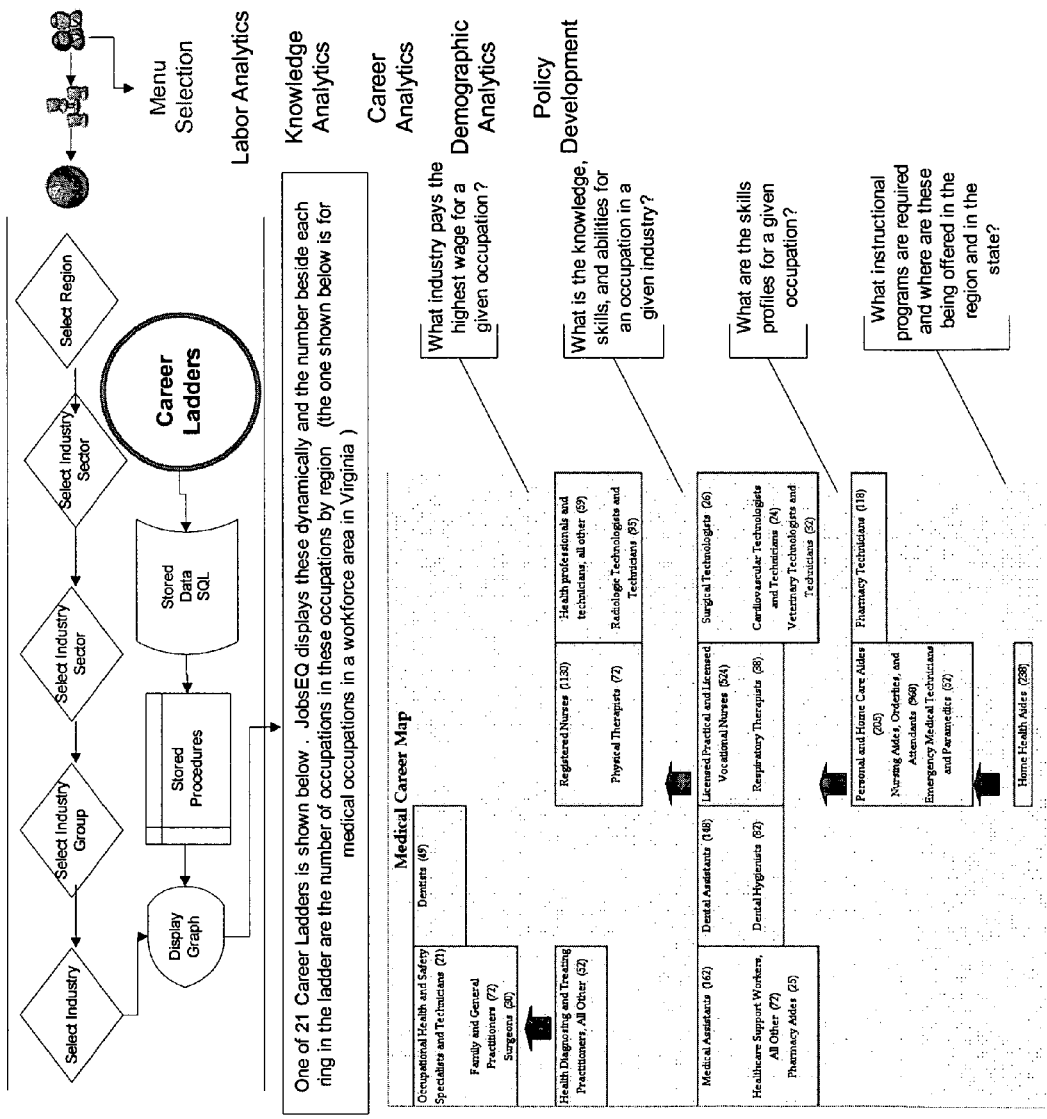
FIG. 29 illustrates the production of "Career Training Ladders".

FIG. 29 illustrates the production of "Career Training Ladders." Career training ladders identify the career paths that individuals may follow (across or within industries) as they increase their knowledge and capabilities. Career training ladders are particularly useful to job-seekers and training professionals. The career training ladders shown in JobsEQ™ detail the vertical relationships among occupations that were created by CEA using data mining techniques. Within each occupation family, a worker in lower-level occupations can move to higher-level ones through proper training and experience.

The illustrated example of a career ladder is the nursing occupation family which is embedded in the Medicine and Dentistry Ladder. A worker can move from low-level occupations such as Home Health Aides, to Nursing Aides, to Licensed Practical and Vocational Nurses, all the way to Registered Nurses. Characteristics of the occupation are used to vertically link occupations. The numbers on the career training ladders that are shown in parentheses represent an estimate of the number of individuals in the given region that are employed in that occupation.

The user can obtain the following information for the occupation by clicking on the occupation title in the training ladder: description of the occupation; wages for the occupation for various industries; skills and other attributes needed to succeed in the occupation; and instructional programs suggested to quality for the occupation.

Figure 30:
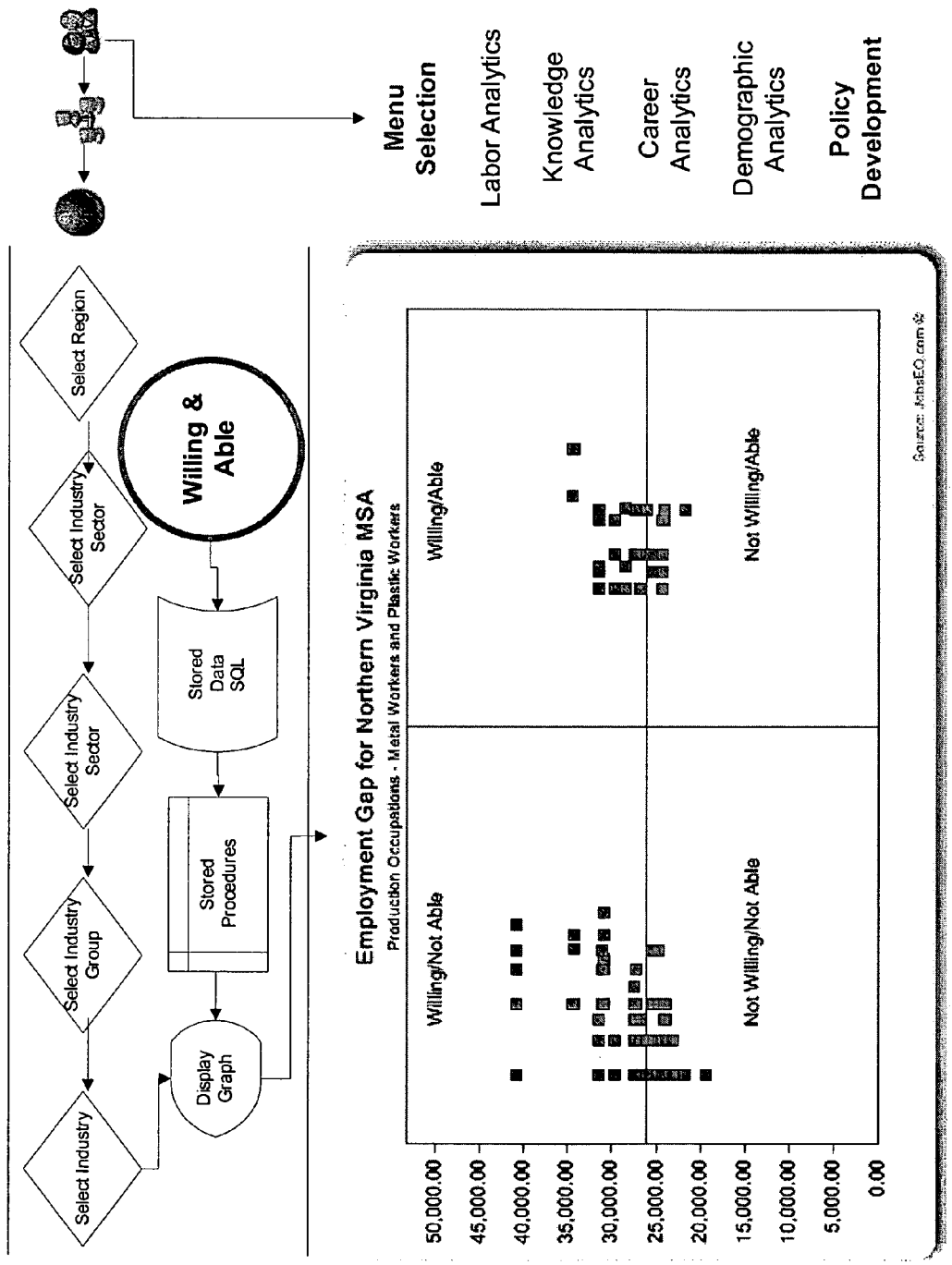
FIG. 30 is a schematic diagram illustrating the production of a "Willing and Able" chart. The Willing and Able tool allows the user to specify an occupation and to then examine related occupations for their appeal as career-change options.

FIG. 30 is a schematic diagram illustrating the production of a "Willing and Able" chart. The Willing and Able tool allows the user to specify an occupation and to then examine related occupations for their appeal as career-change options.

For this analysis, the user must first select a major occupation and then a minor occupation (see occupation selection for more details). The data for the minor occupation will then be displayed when the Go button is clicked. Regional selection is also an option for this analytic. The chart produced is shown in Figure CA. Each of the small squares represents an occupation. When the mouse pointer is moved over a square and held stationary, a pop-up text will identify the name of the occupation as well as the average salary for the occupation in the region selected. This analysis considers a worker in the selected occupation who may be looking to enter a different occupation. This person is considered "willing" to take a new job that requires no more than a 10% pay cut from a present or previous job. The horizontal line across the middle of the chart (at approximately $26,000 in the above example) represents this threshold. Above the line are occupations the person would be "willing" to take, below the line would be occupations the person would be "not willing" to take.

Occupations that someone would be "able" to enter are those in which little or no training is required beyond current qualifications. Occupations that a worker would be "not able" to enter are those that may be related to the person's present occupation, but would require more extensive training, education, or experience.

Applications

This tool has primary applications in workforce development. For example, a group of workers may have been laid-off and there are no prospects for their current occupations; they will be in need of career changes. The four quadrants in this analysis group potential new occupations by their appeal:

"Willing/Able"—Upper-right quadrant. Occupations in this category will require little further training and will offer salaries ranging from a small pay cut to a salary increase.

"Willing/Not Able"—Upper-left quadrant. Occupations in this category offer suitable salaries but will require more extensive training or education preparation.

"Not Willing/Able"—Lower-right quadrant. Occupations in this category require little further training but the salaries constitute more than a 10% cut in pay.

"Not Willing/Not Able"—Lower-left quadrant. Related occupations in this category are likely the least desirable for a career change. These require more extensive training or education and also offer salaries that would be more than a 10% cut in pay. Nevertheless, they are related occupations, and they may be the only ones that have growth prospects in the region in question (see occupation drill-downs in Labor Supply and Demand for analysis of this question).

Figure 31:
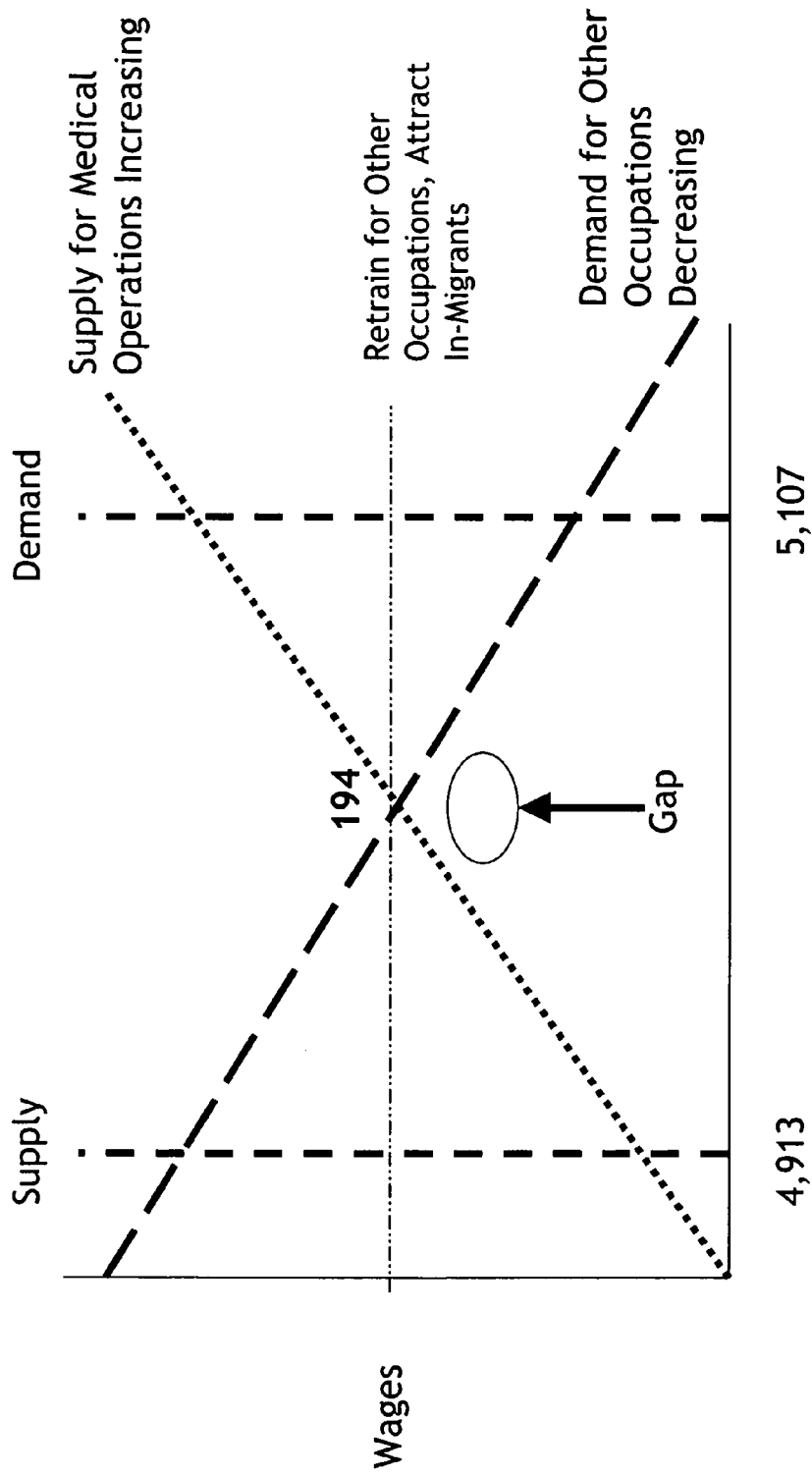
FIG. 31 graphically represents a gap in employment in the medicine/dentistry field.
Figure 32:
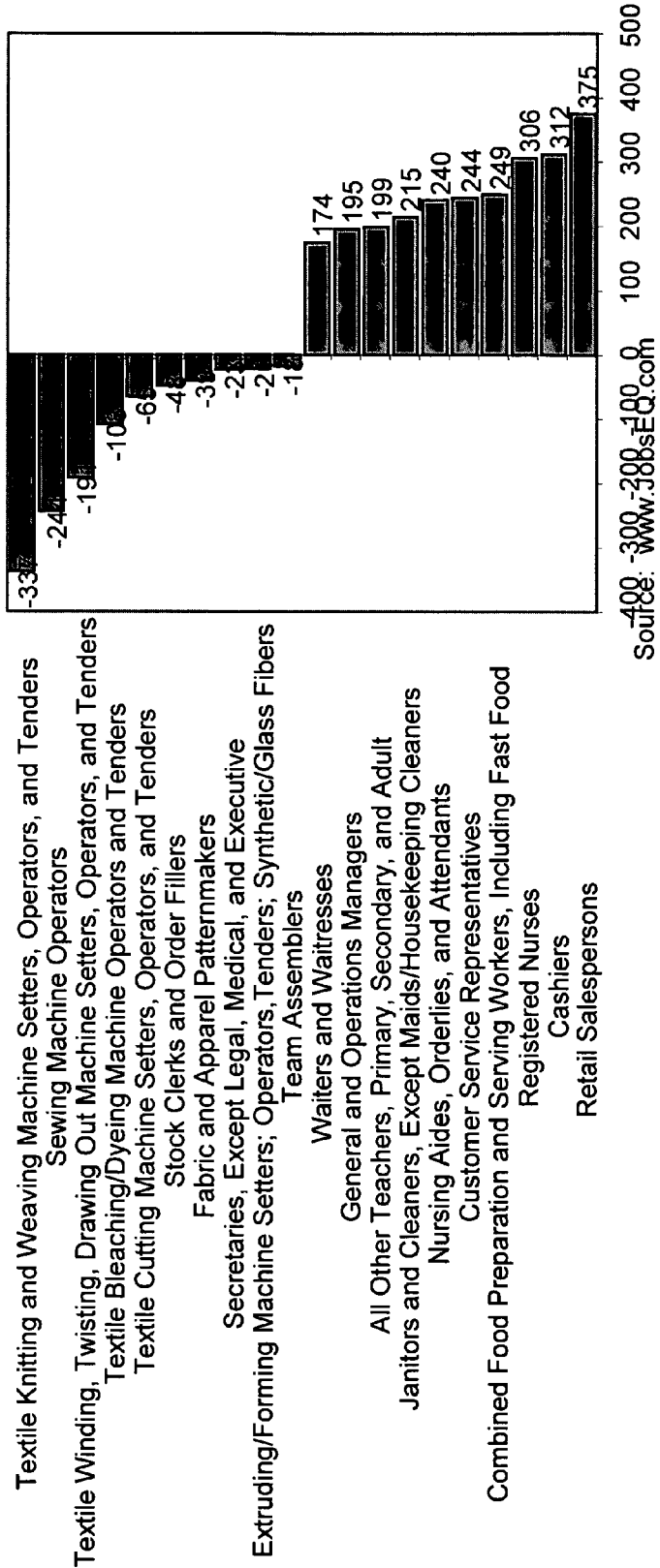
FIG. 32 is a graphical representation of occupations with the largest forecasted growth and decline in a particular region.

FIG. 30 illustrates the method used to produce the chart shown in FIGS. 31 and 32.

FIG. 31 graphically represents a gap in employment in the medicine/dentistry field.

FIG. 32 is a graphical representation of occupations with the largest forecasted growth and decline in a particular region. This process identifies gaps in occupations or training programs expected to occur over the next ten years. True equilibrium takes into account the demand for an occupation and/or individuals with certain training/degrees on the industry side and on the supply of such individuals on the occupation side. JobsEQ™ adjusts the gaps to include dynamics statistics like the emerging workforce (those entering the workforce for the first time), the number unemployed, population growth rates, retirements and other impacts to the type and inventories of workers by region.

Figure 33:
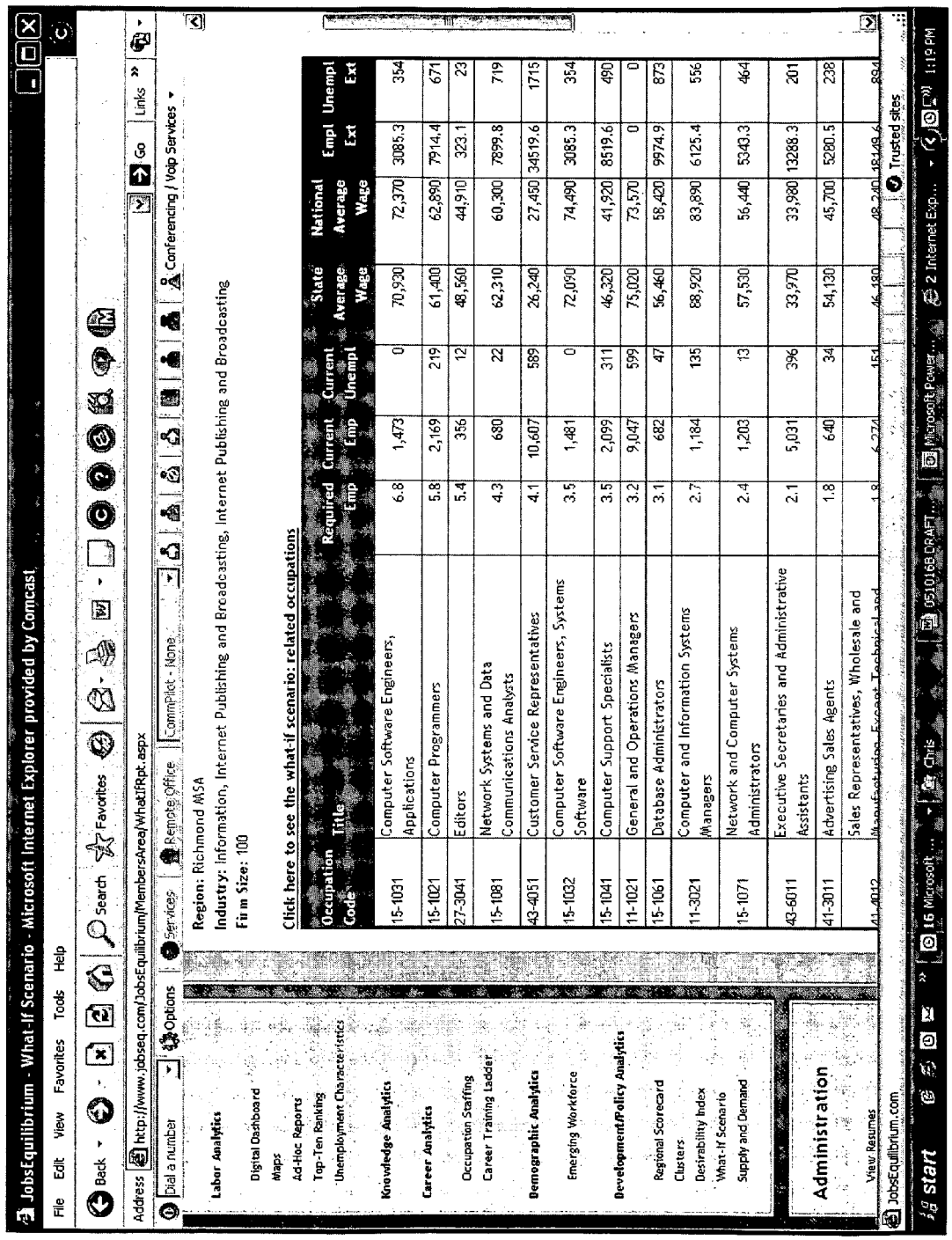
FIG. 33 is a schematic diagram illustrating a "What If" report. The 'What If Report' is identified on the 'development and policy' analytics under 'member options.'

FIG. 33 is a schematic diagram illustrating a "What If" report. The 'What If Report' is identified on the 'development and policy' analytics under 'member options.' It identifies the estimated number of workers required in an industry chosen by the user by using the drop down industry choices noted in earlier analytics. By using the selection criteria the user can select a region, an industry, and a firm size for a test scenario. The user can also select the number of occupations to show for the firm (explained in more detail below). After all criteria are selected, clicking on the "Go" button will start the analytic and display the results.

The resulting table shows detailed information for each occupation that would be required to support the given firm. The following fields are shown:

Occupation code (SOC Code)

Occupation title

Required Employees—Number of employees needed in the specified occupation.

Current Employees—Number of employees currently employed in the occupation.

Current Unemployed—Number of workers unemployed in the occupation.

State Average Wage—Average wage for selected occupation in the given region.

National Average Wage—Average wage for selected occupation for the nation.

Employment Extended—Number of currently employed workers in other occupations who have the skills to fulfill the specified position's needs.

Unemployed Extended—Number of currently unemployed workers in other occupations who have the skills to fulfill the specified position's needs.

The analysis for the impact of a firm closing follows closely the analysis of a firm relocation. To see the impact of a firm closing, the relocation analysis is performed as described above, but for the firm size a negative number is entered instead of positive. The results will appear similar, but the numbers in the required employment column now represent lost employment due to the firm closing.

Applications of the 'what if report' include the following:

If a firm enters a region, what occupations will be needed?

Are skilled workers available in the region to fill these positions?

Does the region have currently unemployed workers with skills similar enough to fill the new firms needs?

If a firm is leaving a region, what occupations are expected to be lost?

The following is an explanation of "Extension Occupations" used for the 'what if' and training ladder maps. The process used to find related occupations is based on the vector model. This involves giving each occupation a location in a multi-dimensional space based upon a set of attributes in one of the following categories: abilities, knowledge, skills, interests, tasks, and work activities. Each attribute in this set is given a weight between 0 and 1. After computing this vector for each occupation, the cosine distance formula is used to measure the similarity of two occupations.

The cosine distance formula is defined as the following:

$$\frac{\sum_{i=1}^{|T|} f(v_i) \cdot f(w_i)}{\sqrt{\sum_{i=1}^{|T|} f(v_i)^2} \cdot \sqrt{\sum_{i=1}^{|T|} f(w_i)^2}}$$

Where v and w represents two occupations and T represents the complete set of attributes in a particular category. In this formula, the function f represents a dampening function, which is log. When two occupations have similar attributes, their vectors become coincident and the cosine distance approaches 1. If the occupations are unrelated, the vectors will be orthogonal with a value approaching 0.

This method is repeated for each category of attributes. The total cosine distances are combined with equal weights (⅙). Therefore, we define the final similarity of two occupations as the following:

$$OccupationSim(A, B) = \sum_{\forall t \in Categories} w_t \cdot cossim(A_t, B_t)$$

Figure 34:
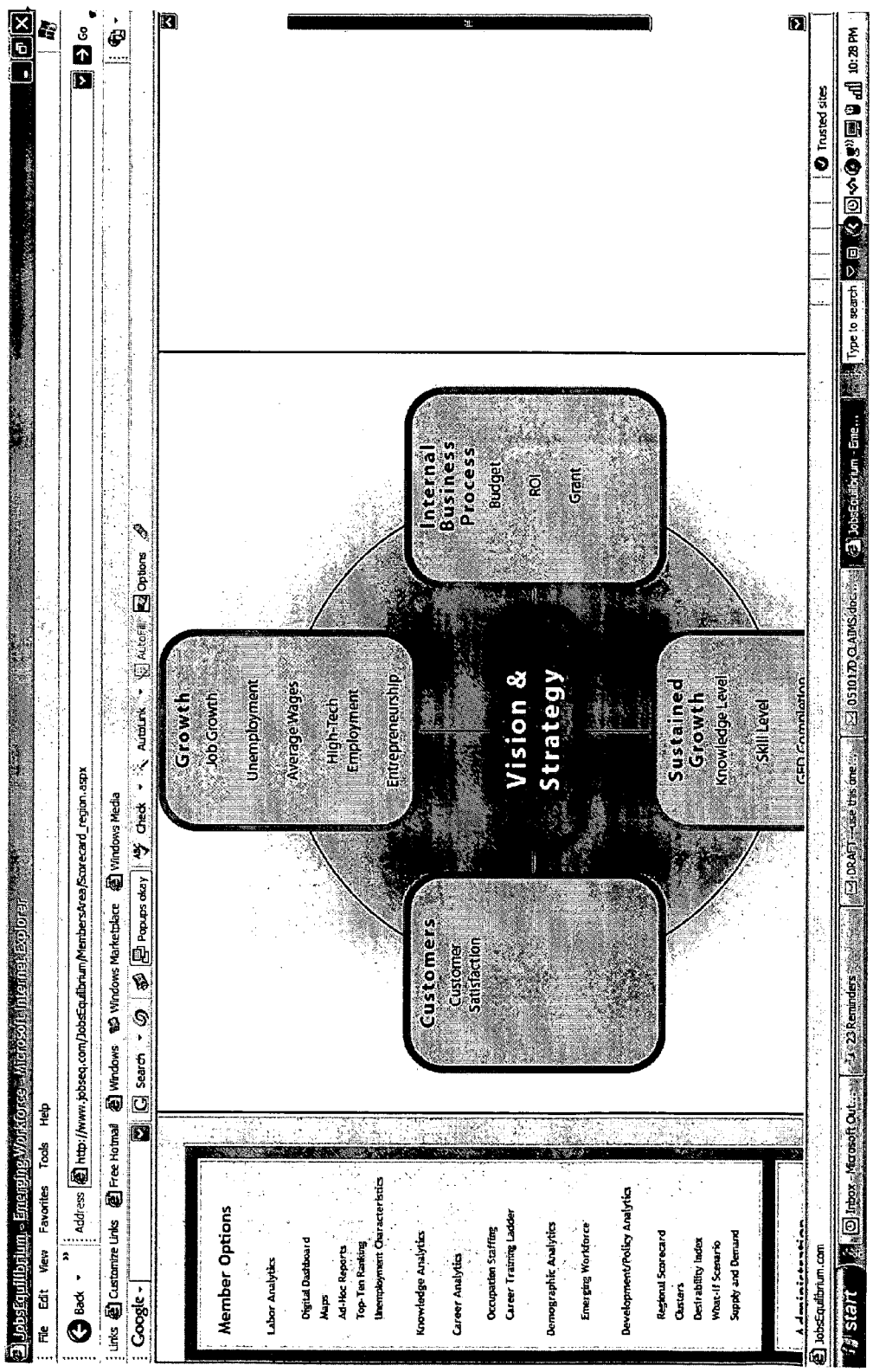
FIGS. 34 and 35 are schematic diagrams (upper and low portions of screens, respectively) illustrating the balanced scorecard analytic which is part of the policy development category for JobsEQ™.
Figure 35:
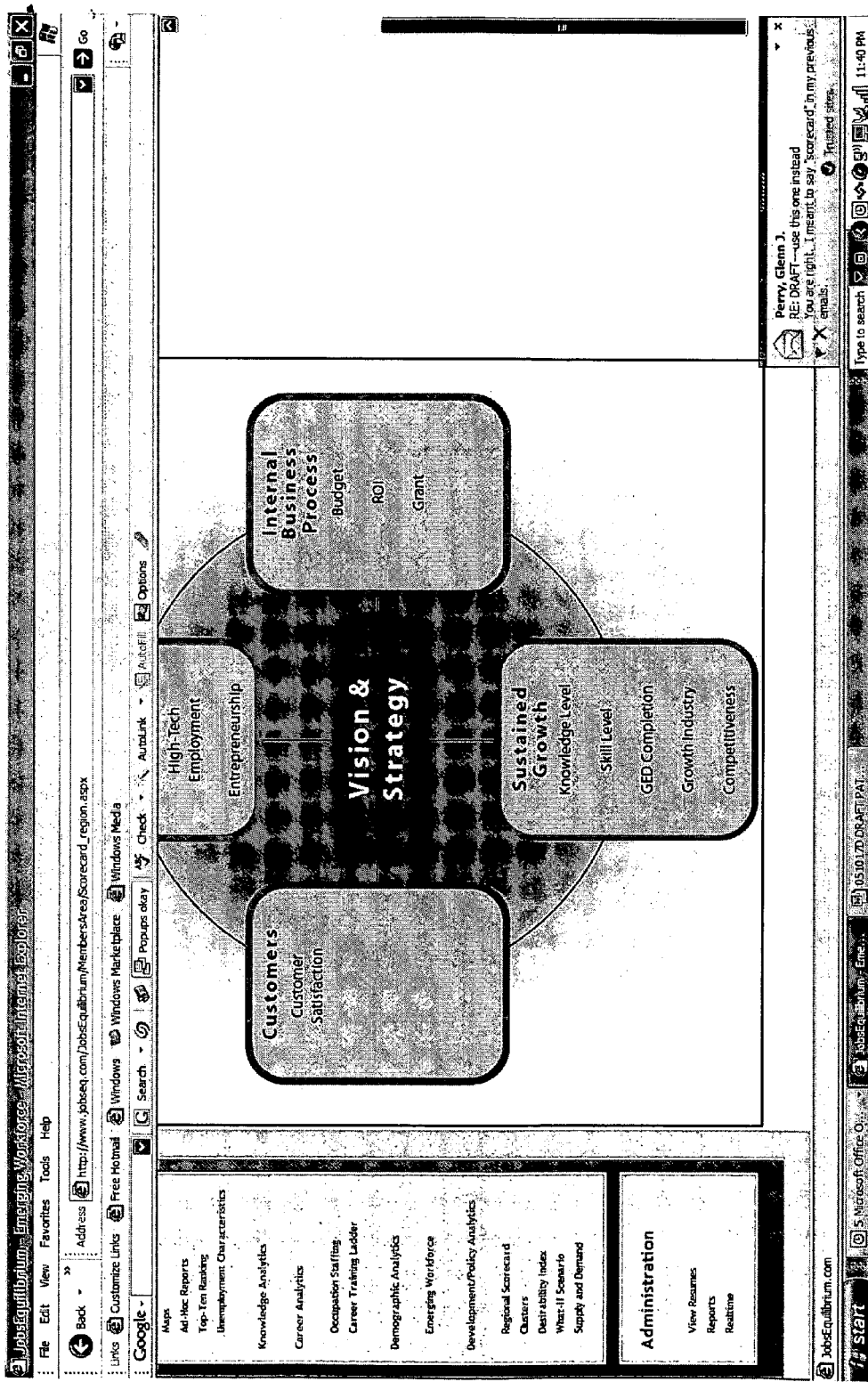

FIGS. 34 and 35 are schematic diagrams (upper and low portions of screens, respectively) illustrating the balanced scorecard analytic which is part of the policy development category for JobsEQ™.

With JobsEQ™, you get the most complete balanced scorecard solution for workforce, economic, and education development and policy reform brings together the various 'silo' agencies across localities, regions, states and countries for:

Strategy

The Strategy component captures and organizes Balanced Scorecard information. It translates volumes of data into meaningful information about enterprise output that can be viewed from many perspectives, including vision, mission, strategy, objectives, measures and initiatives. An appropriate balanced scorecard can scan from top to bottom, providing a corporate-level scorecard, then moving on to views of business units, departments and so on; the view of the user is balanced with the day-to-day activities of the user such that the user's performance is measured in terms of activities over which the user's 'sphere of influence' is directly linked.

Communications

A scorecard offers an accurate assessment of the progress users have made translating strategy into action. It can monitor key leading and lagging indicators—allowing you to assess which strategies are yielding the desired results while working within the best practices for Baldridge and Sixth Sigma business norms. The Communications component provides a way to communicate a strategy to the rest of the organization. Strategic Performance Management offers enabling options which facilitate collaborative efforts, empowering organizations with integrated strategies and development environments.

Updateable

A complete information-analysis solution must do more than just provide data access. It should also enable the analysis of data outputs in new and different ways while simultaneously anticipating business trends and policy reforms. Strategic performance management automates the implementation of a balanced scorecard—enabling users to update the scorecard at regularly scheduled intervals. Users can query, report, forecast and simulate economic trends modeling. Users can access all relevant data sources immediately knowing that performance results are based on the latest, most accurate input to the scorecard.

The inventions have been explained in part by using many examples. References to time, geographical regions, etc. are intended to be exemplary. The principles explained in this patent can be utilized with data relating to various regions, time frames, etc. Thus, it is intended that the claims not be limited to specific geographical regions, time frames, etc.

The invention claimed is:

1. An information system for assessing demand for occupations and skills and the need for various training and instructional programs comprising:

a. a relational database resident in a computer-readable medium containing economic development information, workforce development information and education key information, such as historical and forecasted economic data regarding economic variables including jobs, unemployment, wages, productivity, and any changes therein;

b. a graphical user interface providing distributed computer network access to said database and a plurality of software implemented user tools for assembling and processing the data in ways meaningful to the user, including correlation of the information in said database by one or more of the following parameters: region, industry, employer characteristic, occupation; worker attribute; demographics, said graphical user interface and said tools being operable to allow a user to selectively retrieve analysis of one or more of the following:
   i. forecast the supply and demand of labor for a given region;
   ii. career training ladders identifying the career paths that individuals may follow or firms may utilize to improve their internal labor force;
   iii. related occupations for their appeal as career-change options;
   iv. occupations with the largest forecasted growth and decline in a particular region;
   v. the estimated number of workers required in an industry chosen by the user; and
   vi. workers available in the region by skill, wherein said graphical user interface and said tools are operable to allow a user to selectively retrieve analysis of the workers available in a region for a user-selected industry on a user readable display indicating:
   a plurality of occupations;
   a number indicating the number of required employees for each of said occupations;
   a number indicating the number of employed persons in said region corresponding to each of said occupations; and
   a number indicating the number of unemployed persons in said region corresponding to each of said occupations,
   wherein one of said software implemented tools assigns an occupation attribute value between 0 and 1 for each of a plurality of pre-defined occupation attributes to each of said occupations;
   wherein said software implemented tool assigns an occupation vector in multi-dimensional space to each of said occupations based on said occupation attribute values corresponding to each of said occupations;
   wherein said software implemented tool computes the angular cosine distance between every pair of said occupation vectors utilizing a cosine distance formula; and
   wherein said software implemented tool classifies a first occupation as an extension occupation in relation to a second occupation if said first occupation is similar to said second occupation when said angular cosine distance between the occupation vector corresponding to said first occupation and the occupation vector corresponding to said second occupation is less than a pre-determined threshold; and c. a computer for processing said data.

2. An information system for assessing demand for occupations and skills and the need for various training and instructional programs comprising:

a. a relational database resident in a computer-readable medium containing economic development information, workforce development information and education key information, such as historical and forecasted economic data regarding economic variables including jobs, unemployment, wages, productivity, and any changes therein;

b. a graphical user interface providing distributed computer network access to said database and a plurality of software implemented user tools for assembling and processing the data in ways meaningful to the user, including correlation of the information in said database by one or more of the following parameters: region, industry, employer characteristic, occupation; worker attribute; demographics, said graphical user interface and said tools being operable to allow a user to selectively retrieve analysis of one or more of the following:
   i. forecast the supply and demand of labor for a given region;
   ii. Career training ladders identifying the career paths that individuals may follow or firms may utilize to improve their internal labor force;
   iii. related occupations for their appeal as career-change options;
   iv. occupations with the largest forecasted growth and decline in a particular region;
   v. the estimated number of workers required in an industry chosen by the user; and
   vi. workers available in the region by skill, wherein said graphical user interface and said tools being operable to allow a user to selectively retrieve analysis of related occupations for their appeal as career-change options in a region provide a user readable display indicating:
   a four-quadrant chart;
   wherein the four quadrants of said chart are: 1) Not willing, not able, 2) Not willing, but able, 3) Willing, but not able, and 4) Willing and able;
   wherein all occupations in said region are represented on said chart as a data point in relation to a user of said information system
   wherein "willing" is defined as an occupation with a salary at or above a pre-defined percentage of said user's current or most recent salary;
   wherein "not willing" is defined as an occupation with a salary below said pre-defined percentage of said user's current or most recent salary;
   wherein "able" is defined as an occupation with skills similar to the skills of said user's current or most recent occupational position; and
   wherein "not able" is defined as an occupation with skills dissimilar to the skills of said user's current or most recent occupational position; and c. a computer for processing said data.

3. The information system of claim 2 wherein said pre-defined percentage of said user's current or most recent salary is 90%.

4. The information system of claim 2
   wherein said software implemented tool assigns an occupation attribute value between 0 and 1 for each of a plurality of pre-defined occupation attributes to each of said occupations in said region;
   wherein said software implemented tool assigns an occupation vector in multi-dimensional space to each of said occupations based on said occupation attribute values corresponding to each of said occupations;
   wherein said software implemented tool assigns an occupation attribute value between 0 and 1 for each of said plurality of pre-defined occupation attributes to said user's current or most recent occupational position;
   wherein said software implemented tool assigns a position vector in multi-dimensional space to said user's current or most recent occupational position based on said occupation attribute values corresponding to said user's current or most recent occupational position;

wherein said software implemented tool computes the angular cosine distance between said position vector and each of said occupation vectors utilizing a cosine distance formula;

wherein said software implemented tool classifies each of said occupations as an "able" occupation if the angular cosine distance between the occupation vector corresponding to said occupation and the position vector corresponding to said occupational position is less than or equal to a pre-determined threshold; and wherein said software implemented tool classifies each of said occupations as an "not able" occupation if the angular cosine distance between the occupation vector corresponding to said occupation and the position vector corresponding to said occupational position is greater than a pre-determined threshold.

5. The information system of claim 4 wherein said graphical user interface proportionally spaces said occupations in a user readable format on said chart to indicate the relative similarity of occupations based on said angular cosine distance calculations.

6. The information system of claim 4 wherein said graphical user interface proportionally spaces said occupations in a user readable format on said chart to indicate the relative salaries of occupations.

7. The information system of claim 4 wherein said predefined occupation attributes are selected from the group consisting of: abilities, knowledge, skills, interests, tasks, and work activities.

8. The information system of claim 4 wherein said cosine distance formula comprises a dampening function.

9. The information system of claim 8 wherein said dampening function is a logarithmic function.

10. The information system of claim 2 wherein said graphical user interface groups similar occupations together into an occupation family.

11. A method for electronically estimating from a relational database whether a region has enough unemployed workers with skills suitable to fill a firm's employment needs and displaying the estimation in a user readable format comprising the steps of:
 a) determining the number of new employees needed by a firm;
 b) determining the occupational position required for each of said needed new employees;
 c) determining the number of unemployed workers in a region;
 d) determining the occupation of each of said unemployed workers;
 e) determining which unemployed workers have occupations similar to said required occupational positions of said firm; and
 f) displaying a report in a user readable format indicating the number and occupation of unemployed workers in a region with skills suitable to fill said firm's employment needs, wherein step e comprises:
 defining a plurality of occupation attributes;
 assigning an occupation attribute value between 0 and 1 for each of said occupation attributes to each of said required occupational positions of said firm;
 assigning a position vector to each of said required occupational positions;
 wherein said position vector is a vector in multi-dimensional space according to each of said occupation attribute values of said occupational position;
 assigning an occupation attribute value between 0 and 1 for each of said occupation attributes to each of said occupations of said unemployed workers;
 assigning an occupation vector to each of said occupations;
 wherein said occupation vector is a vector in multi-dimensional space according to each of said occupation attribute values of said occupation;
 computing the angular cosine distance between every position vector and every occupation vector utilizing a cosine distance formula; and
 classifying the occupation of an unemployed worker as suitable to fill said firm's employment needs if the angular cosine distance between the occupation vector corresponding to said occupation and one of said position vectors is less than a pre-determined threshold.

12. The method of claim 11 wherein said occupation attributes are selected from the group consisting of: abilities, knowledge, skills, interests, tasks, and work activities.

13. The method of claim 11 wherein said cosine distance formula comprises a dampening function.

14. The method of claim 13 wherein said dampening function is a logarithmic function.

15. The method of claim 11 wherein similar occupations are grouped together into an occupation family.

16. A method for electronically analyzing from a relational database related occupations in a region for their appeal as a career-change option comprising the steps of:
 a) determining the occupations in said region;
 b) determining the salary of each of said occupations;
 c) determining whether each of said salaries is at or above a pre-defined percentage of a user's current or most recent salary; and
 d) determining whether each of said occupations is similar to a user's current or most recent occupational position, wherein step d comprises:
 defining a plurality of occupation attributes;
 assigning an occupation attribute value between 0 and 1 for each of said occupation attributes to each of said occupations in said region;
 assigning a position vector to each of said occupations;
 wherein said position vector is a vector in multi-dimensional space according to each of said occupation attribute values of said occupations;
 assigning an occupation attribute value between 0 and 1 for each of said occupation attributes to said user's current or most recent occupational position;
 assigning a position vector to said occupational position;
 wherein said position vector is a vector in multi-dimensional space according to each of said occupation attribute values of said occupational position;
 computing the angular cosine distance between said position vector and each of said occupation vectors utilizing a cosine distance formula; and
 classifying each of said occupations as similar to said user's current or most recent occupational position if the angular cosine distance between the occupation vector corresponding to said occupation and said occupational position vector is less than a pre-determined threshold.

17. The method of claim 16 wherein said occupation attributes are selected from the group consisting of: abilities, knowledge, skills, interests, tasks, and work activities.

18. The method of claim 16 wherein said cosine distance formula comprises a dampening function.

19. The method of claim 18 wherein said dampening function is a logarithmic function.

20. The method of claim 19 wherein similar occupations are grouped together into an occupation family.

* * * * *